US011126622B1

(12) United States Patent
Hazel et al.

(10) Patent No.: US 11,126,622 B1
(45) Date of Patent: Sep. 21, 2021

(54) METHODS AND APPARATUS FOR EFFICIENTLY SCALING RESULT CACHING

(71) Applicant: CHAOSSEARCH, INC., Andover, MA (US)

(72) Inventors: Thomas Hazel, Boston, MA (US); David Noblet, Londonderry, NH (US); Rudresh Trivedi, Boston, MA (US)

(73) Assignee: CHAOSSEARCH, INC., Boston, MA (US)

( * ) Notice: Subject to any disclaimer, the term of this patent is extended or adjusted under 35 U.S.C. 154(b) by 0 days.

(21) Appl. No.: 17/190,328

(22) Filed: Mar. 2, 2021

(51) Int. Cl.
*G06F 16/2453* (2019.01)
*G06F 16/22* (2019.01)

(52) U.S. Cl.
CPC .... *G06F 16/24539* (2019.01); *G06F 16/2228* (2019.01)

(58) Field of Classification Search
CPC ....................... G06F 16/24539; G06F 16/2228
See application file for complete search history.

(56) References Cited

U.S. PATENT DOCUMENTS

| | | | | |
|---|---|---|---|---|
| 7,885,947 B2 * | 2/2011 | Michele | G06Q 10/087 707/705 |
| 2016/0259823 A1 * | 9/2016 | Veldhuizen | G06F 16/24537 |
| 2019/0266170 A1 * | 8/2019 | Hazel | G06F 16/221 |

* cited by examiner

*Primary Examiner* — Cam Y T Truong
(74) *Attorney, Agent, or Firm* — Procopio, Cory, Hargreaves & Savitch LLP

(57) ABSTRACT

Apparatus, methods, and computer-readable media facilitating efficiently scaling result caching are disclosed herein. An example method includes generating an index based on a plurality of source data objects in an object storage system. The generated index comprises a manifest, at least one symbol file, and at least one locality file. The example method also includes receiving a search query for the plurality of source data objects stored in the object storage system, and querying the generated index based on the search query and a manifest root file of the manifest. Additionally, the example method includes generating a materialized view of a result set of the search query based on the querying of the generated index. The example method also includes storing a cached manifest file at the generated index, the cached manifest file mapping the search query to a segment of the generated index based on the result set.

20 Claims, 18 Drawing Sheets

1000

| | FirstName | FirstName | Company | GroupID |
|---|---|---|---|---|
| 1002a | foo | bar | techInc | Scope#1 |
| 1002b | foo | baz | medInc | Scope#1 |
| 1002c | bar | stone | acmeInc | Scope#2 |
| 1002d | foo | baz | compInc | Scope#2 |
| 1002e | bar | well | chaosInc | Scope#3 |
| 1002f | bar | tar | searchInc | Scope#3 |

```
Class ScopeGroup:
  def _init_(self, i):
    self.id = i # GroupID

modder = 3
scopes = [ScopeGroup(int(random.random()*1000)) for I in range(20)]
idlist = [idx + 1 for ids, val in enumerate(scopes) if val.id % modder == 0]
size = len(scopes)
groups = [scopes[i:j] for i, j in zip([0] +idlist, idlist + ([len(scopes)] if idlist[-1] != len(scopes else []))]


for sg in groups:
  sgID = str(hash('-'.join(str(e.id) for e in sg)))
  cacheIndex.update(sgID, results)

# id1, id2, id3 are created from the above function


for sg in groups:
  sgID = str(hash('-'.join(str(e.id) for e in sg)))
  results = cacheIndex.find(sgID)
```

FIG. 11

METHODS AND APPARATUS FOR EFFICIENTLY SCALING RESULT CACHING

INTRODUCTION

Field of Technology

The present disclosure relates generally to the field of object storage, and, more particularly, to methods and apparatus for efficiently scaling result caching.

Background

Object storage is a type of data storage architecture that manages data as objects, which has become popular due to its prevalence in cloud storage services. Object storage may be considered a form of a distributed key/value storage service, where keys (unique indexes) and values (opaque data) are accessed via PUT, GET, and LIST interfaces. Consequently, such data is copied out to do a variety of processing and/or analysis, where the results of this external execution is often put right back into object storage. The cycle of Extracting, Transforming, and Loading (ETL) data is a large part of the data storage and management problem, though not the only issue. The advantages of object storage is its simplicity and scalability, encouraging cloud based storage services to be used as data lake repositories, where any type of data of any scale can be stored with the belief that value can be derived at a later date. However, this can lead to data being stored in a disjoined, disparate, and schema-less manner. Frequently, this unstructured data is irregular, malformed, and chaotic, which is a direct result of object storage constructs.

Knowing what has been stored in object storage (e.g., “what is in your buckets”) is another issue. In other words, understanding “what” to extract and “how” to extract information from stored data is a major step before an ETL operation can be performed. The ability to group information into “like” subsets is important to efficiently use object storage. However, once this information has been identified, the actual data analysis is yet another significant hurdle to overcome. Analysis of such disjoined, disparate, or malformed data may be processed either through manual inspection via scaffolding such as via Hadoop™ (raw data) or through manual transformation for analytic services such as Amazon Redshift™ (tabular data) and/or Elastic™ (text data). Manual inspection and manual transformation are each time consuming, complicated, and costly, and may contribute to the failures of “data lakes.”

Caching is a technique to improve response time. Caching may be used in a variety of applications and scenarios, such as serving website page requests to presenting query results from a database. Example scenarios in which a system may enable caching include when sub-second request times are needed or when an ability to increase the number of requests per second is required (e.g., due to database limits), among others.

With respect to databases, caching of information may improve database query performance. An example aspect of caching is the use of memory versus disk accesses. For example, performance of memory access may be magnitudes faster when storing the results of a previous request. However, example drawbacks of using memory include the cost of the memory and the volatile nature of memory. While disk access times have improved (e.g., from tapes to hard-disk drives (HDDs) to solid state drives (SSDs) to flash memory), disks have not reached the design performance of memory, such as random access memory (RAM). Additionally, while object storage, such as AWS Simple Storage Service (S3)™ made available by Amazon, has reduced the cost and complexity of durable storage compared to traditional storage mediums, some object storage systems have reversed some of the previously achieved performance gains, for example, obtained by SSD and flash memory.

SUMMARY

Aspects presented herein provide solutions to these problems, enabling such functionality to be embedded directly into object storage and, thus, making object storage smarter and more capable. Aspects include caching techniques that enable achieving the performance benefits of caching, but on object storage. However, it may be appreciated that the example caching techniques disclosed herein are not limited to object storage and may be applied to any volatile memory and/or persistent memory.

Example techniques disclosed herein facilitate the efficient scaling of caching on object storage, while also achieving the reduced cost and complexity associated with durable storage. That is, disclosed techniques provide increasing query performance, such as sub-second query responses, that can be scaled in the context of database requirements, such as big data scenarios (e.g., terabyte (TB) or petabyte (PB) datasets).

Example techniques provide the efficient scaling of caching by leveraging a data format for universally representing any data source, with all its potential irregularities, e.g., everything from text-based files such as Text, JSON, and CSV, to image files such as PNG and JPG, and/or video files such as MPEG, AVI etc., so that the data can be virtually transformed and aggregated without considerable computation, while still providing built-in support for both relational queries and text searches. The data format can be manipulated without algorithmic execution and retrieve results at the speed of classic analytic solutions. The data format not only does not increase the actual storage footprint, but may actually decrease it. The data format may be configured to intrinsically describe itself such that it can be exported into other data formats without unnecessary conversion. Aspects of the data format may be referred to herein as “chaos index,” “chaos indexing,” “data edge,” “data edging,” as “indexing based on a symbol file and a locality file” or “indexing based on a separation of information about symbols and locality,” etc.

The indexing provided herein provides an ability to discover and organize data generically and concurrently, an ability to organize and represent data consistently and uniformly, an ability to compress and catalogue data to theoretical minimums, and an ability to query and analyze data without performing Extract, Transform, Load (ETL) processes. The disclosed indexing comprises a storage format where any processing algorithm can be applied to create, organize, and retrieve information.

The indexing provided herein involves separating the symbols of a file from the symbols' location within the file. The indexing may be referred to as indexing based on a symbol file and a locality file or based on a separation of information about symbols and locality. Compression technology may then use the symbol and location of the symbol as part of its algorithm and representation. Among others, symbols within a file may be, for example, words, images, numbers, data, and time types, etc. For example, a document may comprise words (e.g., symbols) placed at particular locations (e.g., “locality”) in a source file to be reconstituted in a lossless approach. By separating the symbols and locations of the symbols, data may be organized and compressed to its optimal state. In contrast, mixing the symbols and the locations of the symbols limits what any given compression algorithm can achieve. Symbols and locality of the symbols are not "like" entities and, thus, cannot be reduced easily. The index format also includes a descriptive "manifest" incorporated into the indexed data source that is used to map together interrelated symbol and locality segments, as well as provide descriptive indicators of how the underlying data is transformed or normalized into an index.

Once data is indexed, the disclosed techniques provide the ability to quickly and easily assemble (or resolve) search queries in a dynamic manner and at scale. Moreover, the disclosed techniques leverage the framework of the indexed data format to partially or fully "match" queries to past query results. Additionally, in contrast to block-level caching that may be used in storage layers, the disclosed caching techniques increase performance of database results.

According to one aspect of the present disclosure, a method for caching in object storage is provided. The example method includes generating an index based on a plurality of source data objects in an object storage system, the generated index comprising a manifest, at least one symbol file, and at least one locality file. The manifest comprises a tree-like data structure of a manifest root file with branch-leaf manifest files, the manifest root file specifying statistical values about at least a first branch-leaf manifest file based on the at least one symbol file and the at least one locality file associated with the first branch-leaf manifest file. The example method also includes receiving a search query for the plurality of source data objects stored in the object storage system. Additionally, the example method includes querying the generated index based on the search query and the manifest root file of the manifest. The example method also includes generating a materialized view of a result set of the search query based on the querying of the generated index. The example method also includes storing a cached manifest file at the generated index, the cached manifest file mapping the search query to a segment of the generated index based on the result set.

In another example aspect, a computer apparatus for caching in object storage is provided. The example computer apparatus includes memory and at least one processor coupled to the memory. The memory and at least one processor are configured to generate an index based on a plurality of source data objects in an object storage system, the generated index comprising a manifest, at least one symbol file, and at least one locality file. The manifest comprises a tree-like data structure of a manifest root file with branch-leaf manifest files, the manifest root file specifying statistical values about at least a first branch-leaf manifest file based on the at least one symbol file and the at least one locality file associated with the first branch-leaf manifest file. The memory and at least one processor may be further configured to receive a search query for the plurality of source data objects stored in the object storage system. Additionally, the memory and at least one processor may be configured to query the generated index based on the search query and the manifest root file of the manifest. The memory and at least one processor may be further configured to generate a materialized view of a result set of the search query based on the querying of the generated index. The memory and at least one processor may be further configured to store a cached manifest file at the generated index, the cached manifest file mapping the search query to a segment of the generated index based on the result set.

According to another example aspect, a computer-readable medium is provided comprising instructions that comprises computer executable instructions for performing any of the methods disclosed herein. The computer-readable medium may be a non-transitory, computer-readable storage medium, for example.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 10 depicts an example cache index, in accordance with various aspects of the present disclosure.

FIG. 11 depicts a listing of pseudocode for scope grouping, in accordance with various aspects of the present disclosure.

DETAILED DESCRIPTION

Example aspects are described herein in the context of a system, method, and computer program product for processing and analyzing data stored in object storage. For example, example aspects describe resolving a search query and caching the results of the search query to improve query performance of the object storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
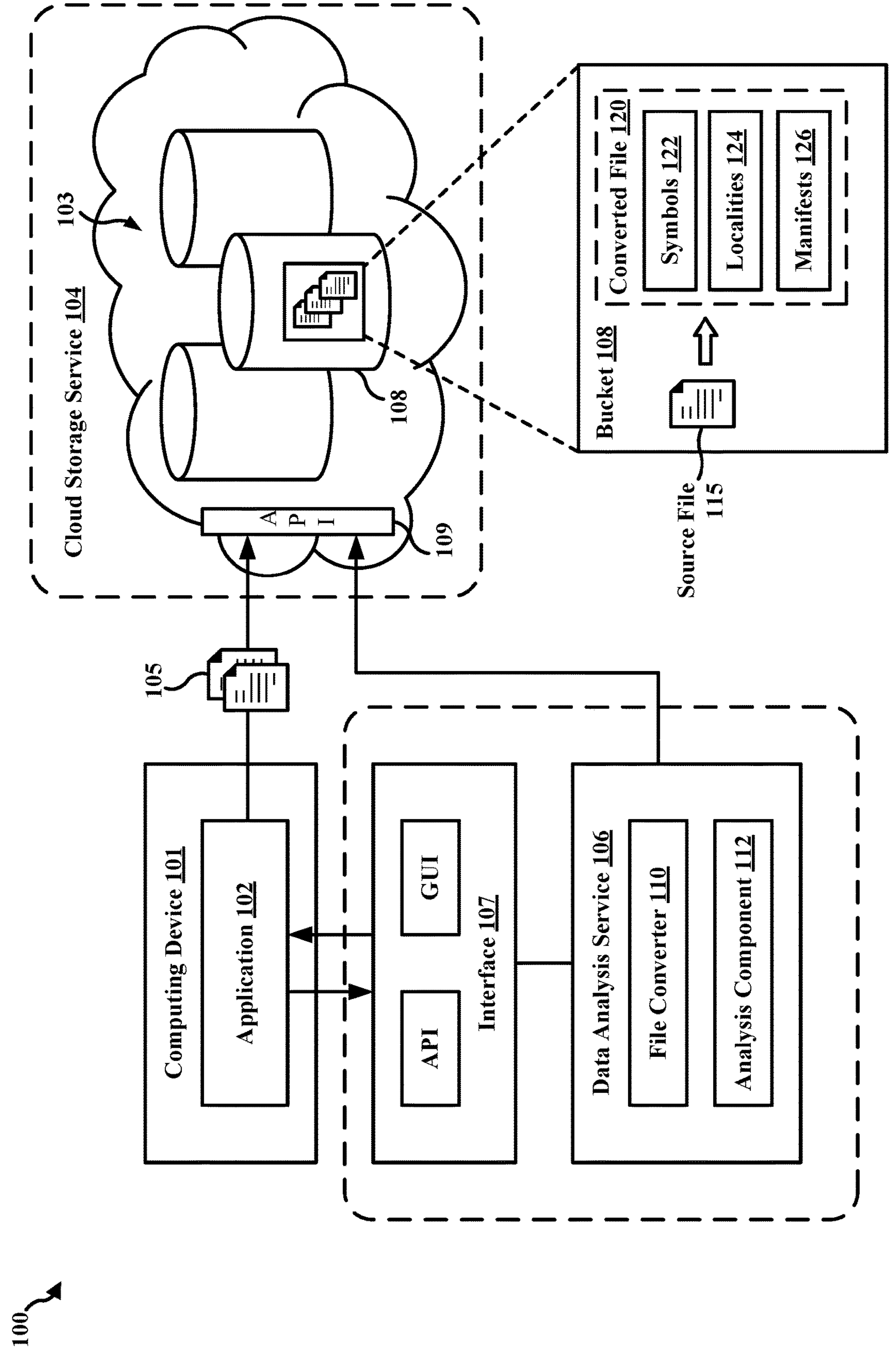
FIG. 1 is a block diagram illustrating a system for processing and analyzing data stored in object storage, in accordance with various aspects of the present disclosure.

FIG. 1 is a block diagram illustrating a system 100 for processing and analyzing data stored in object storage, as presented herein. The system 100 includes a computing device 101 executing an application 102 that is configured to store data 105 in an object storage system 103. In the illustrated example, the object storage system 103 may be provided by a cloud storage service 104. In some examples, the application 102 may have a multi-tier software architecture in which user data of the application 102 is stored in a data layer in the object storage system 103. The application 102 may be configured to store, retrieve, modify, and/or access data in the object storage system 103 via an application programming interface 109 (API), REST-based interface (e.g., using PUT, GET, LIST operations), or other interfaces exposed by the cloud storage service 104.

The object storage system 103 (sometimes referred to as "object-based storage") may include one or more storage devices configured to provide a data storage architecture that manages data 105 as objects, in contrast to a file system-based storage architecture (which manages data in a file hierarchy) or a block-based storage architecture (which manages data as blocks within sectors and tracks of physical media). Examples of object storage include object-based storage provided by such cloud storage services as AWS Simple Storage Service (S3)™ made available by Amazon, Microsoft Azure Storage™, or Google Cloud Storage™. While discussed in the context of public cloud services, it is understood that aspects of the present disclosure may also be applied to "on premise" or private object-based storage systems.

The object storage system 103 is configured to store units of data 105 as"objects" (also referred to as "blobs" in some architectures), and to map each object to a unique identifier (e.g., key, index, object name). For clarity of explanation, the data 105 stored in object storage is interchangeably referred to as "files" in the present disclosure. The object storage system 103 may have a flat hierarchy and include a plurality of buckets 108, which may be logical containers for holding the data 105. That is, each object is stored in a particular bucket 108.

The data stored in the object storage system 103 may represent one or more computer files having a variety of file formats and types of data, including text data, binary data, log files, program data files, CSV (comma-separated values) files, XML files, JSON (JavaScript Object Notation) files, image files, audio files, and video files. The data 105 in object storage may be characterized as structured data, unstructured data, or semi-structured data. A structured data file includes data arranged and organized according to a formal data model, such as the row-and-column structure of relational databases or data tables (e.g., CSV files). While not conforming to some formal structure of data model, a semi-structured data file may include data that is organized or annotated according to some pre-defined manner, for example, data that contains tags, markers, and other syntax that separate semantic elements and assign attributes and a hierarchy to the data (e.g., XML, JSON files). An unstructured data file refers to data that lacks a pre-defined data model and is not organized in a pre-defined manner, such as data found in text-heavy files.

Typically, the application 102 may store an amorphous mix (structured data, semi-structured data, and/or unstructured data) of bulk data in the object storage system 103, resulting in data being stored in a disjointed, disparate, and scheme-less manner. In some examples, the buckets 108 might expose structure by virtue of keys and their associated object or blob. As such, from the point of view of a user, the objects stored in the object storage system 103 may conform to some unspecified structure that is unknown, unless the user downloads and manually inspects the objects.

According to aspects of the present disclosure, the system 100 includes a data analysis service 106 configured to process and analyze the data 105 stored in the object storage system 103. In some examples, the data analysis service 106 may be configured to process files already stored in the object storage system 103, for example, all files contained in a selected bucket 108. In some examples, the application 102 may store data 105 in the object storage system 103 using the data analysis service 106 as an intermediary, which in turn converts the data 105 into files stored in object storage.

In some examples, the data analysis service 106 may be a distributed server application executing on one or more computing devices. The data analysis service 106 may include an interface 107 that enables the application 102 to discover, refine, and/or query the data 105 that the application 102 has stored within its buckets 108 in the object storage system 103. In some examples, the interface 107 may be an API of the data analysis service 106 configured to provide the application 102 programmatic access to the functionality of the data analysis service 106 in relation to the data 105. In some examples, the API of the data analysis service 106 may be configured to extend or override (i.e., "wrap") the API interface provided by the cloud storage service 104. In some examples, the interface 107 of the data analysis service 106 may be a command-line interface (CLI) or a graphical user interface (GUI) of a server-based application that enables a user to interactively discover, refine, and/or query the data 105 stored within object storage.

In the illustrated example of FIG. 1, the data analysis service 106 includes a file converter 110 configured to convert data in object storage to a specialized file format. The converted file format disclosed herein is based on a symbol file and a locality file that enables the data analysis service 106 to discover, refine, and query object storage data in a more efficient manner. The converted file format allows improved compression of the data stored in object storage based on the separation of symbols from their location. The converted file format models data sources in an edge space representation that can be analyzed via complex mathematical algorithms, such as linear algebra computation.

The file converter 110 and/or the data analysis service 106 may process data 105 in object storage in a manner that separates the symbols of a file from their location in the file. In one aspect, the file converter 110 may be configured to, given a source file 115 of data, generate a converted file 120 organized into: (1) a symbols portion 122 (sometimes referred to as a "symbol file") containing the symbols of the source file 115, and (2) a localities portion 124 (sometimes referred to as a "locality file") containing values representing the respective locations of those symbols in the source file 115. In some aspects, the data analysis service 106 may create two files from the source file 115: a symbols file (e.g., "filename.I2S", containing the symbols portion 122) and a locality file (e.g., "filename.L2I", containing the localities portion 124). In some examples, the symbol file and the locality file may be concatenated into one file (e.g., after it is compressed), and in other cases, the symbol file and the locality file may be maintained separately.

In some aspects, the converted file 120 may further include a metadata portion (e.g., "filename.MDS") that contains metrics, statistics, and other metadata related to the original data source 105, to the converted file 120, and to the conversion process performed. For example, the data analysis service 106 of FIG. 1 includes an analysis component 112 configured to analyze one or more converted file(s) 120 and generate statistical information (e.g., a manifest portion 126) based on the data contained in the converted files 120. The analysis component 112 may be configured to perform "in-place" normalization, aggregation, and correlation in which the statistics and manipulation of the data source is within the storage layer itself (i.e., object storage). In some examples, the analysis component 112 may be configured to perform relevant cleansing and preparation functionality by manipulating locality file(s) of converted files in object storage. This is performed with less memory, at larger scale, and with greater speed than existing tooling, which may use separate data warehousing to perform ETL and analysis.

Data compression techniques generally involve encoding some data using fewer bits than the original representation by finding patterns and eliminating redundancy. Consider the simple example of a data source file containing one hundred symbols, in which all symbols are the word "cat." A compressed version of this example data source file may encode this file as "100cat" to eliminate the redundant instances of the symbol "cat," resulting in a data reduction of 300 units of information to 6 units. Data compression algorithms attempt to find common symbols within symbols, as well as sequences represented in a form smaller than its original representation. In another example, a sequence of numbers from one to a million could be represented as "1ToMillion," with a saving factor of 6 times. It has been determined that as the source file gets larger, it becomes more difficult for a compression algorithm to find common or redundant patterns. Accordingly, the format of the converted file is configured to organize symbols in a manner that facilitates more efficient data compression.

Figure 2:
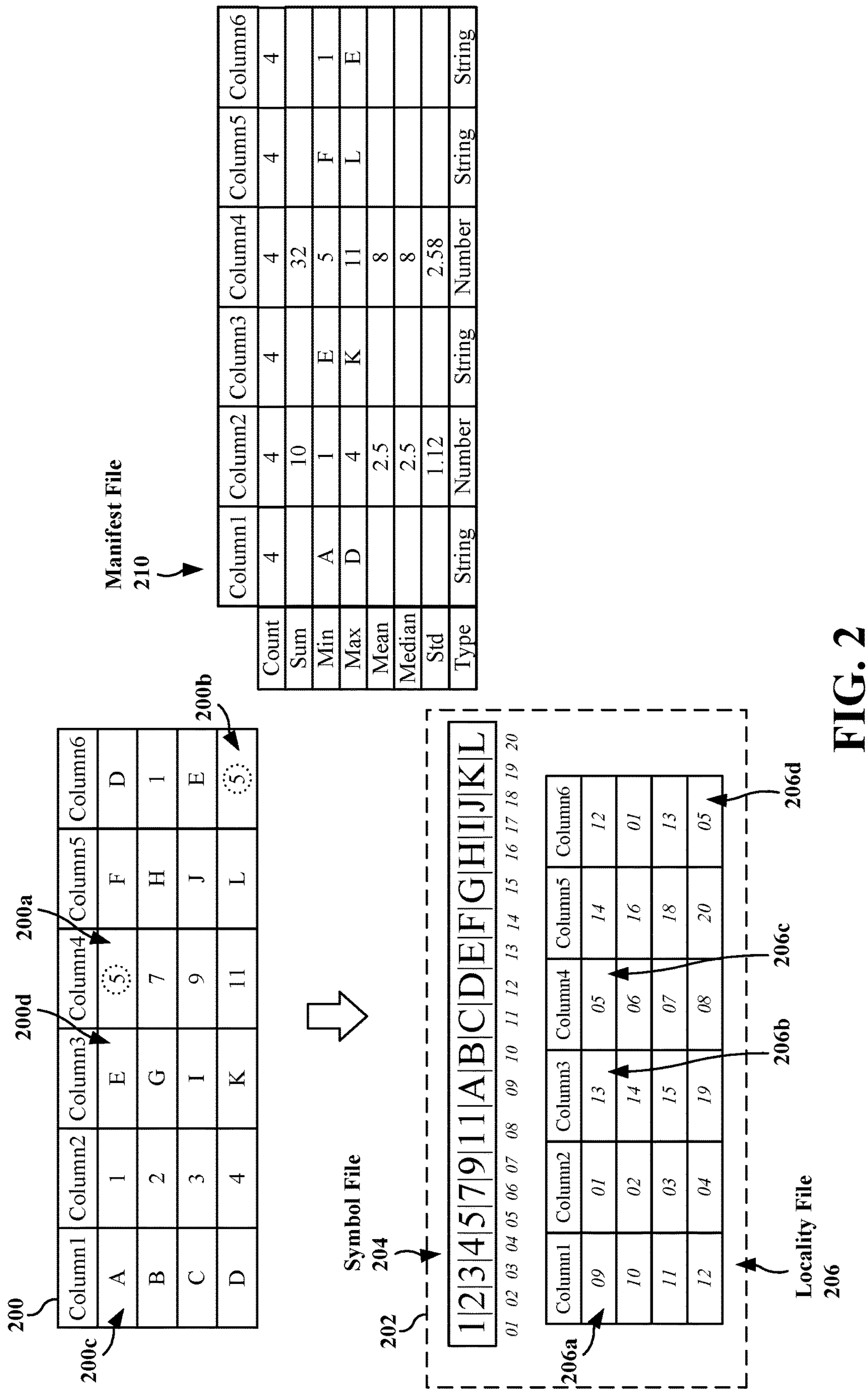
FIG. 2 is a block diagram depicting a structured data source file and a corresponding converted index file, in accordance with various aspects of the present disclosure.

FIG. 2 is a block diagram depicting a structured data source file 200 and a corresponding converted file 202, in accordance with aspects presented herein. The source file 200 contains structured data having a plurality of records organized into rows and columns. For example, the structured data source file 200 contains values having symbols (e.g., "A," "1," "E," "5," "F," "D," etc.) arranged in a 4-row by 6-column table format (the row containing column headers "Column1", "Column2", etc. is omitted from this discussion). The structured data source file 200 is rendered in FIG. 2 in a table format for the sake of illustration, but it is understood that the structured data may be encoded in a variety of formats. For example, the structured data source file 200 may be a delimiter-separated file (such as a CSV file) containing a plurality of records (i.e., lines), where each record comprises fields separated by a delimiter (e.g., a comma). In another example, the structured data source file 200 may be a log file containing a plurality of log entries, for example, separated by a tab or whitespace character.

The file converter 110 of FIG. 1 may create a symbol file 204 associated with the structured data source file 200 that contains each unique symbol found in the structured data source file 200. In some examples, the file converter 110 may perform an initial reduction of the structured data source file 200. For example, the file converter 110 may find and remove duplications and/or may find and order sequences. In some examples, the file converter 110 may scan through the structured data source file 200, identifying each unique symbol contained in the structured data source file 200, order each identified unique symbol, and disregard any duplicate symbols. For example, the file converter 110 may identify that the structured data source file 200 contains a duplicate symbol "5" at a first entry 200*a* (e.g., at the first row, fourth column), as well as at a second entry 200*b* (e.g., at the fourth row, sixth column). In the illustrated example of FIG. 2, the duplicate symbol "5" is highlighted by dashed circles. In some such examples, the file converter 110 may include a single instance of the symbol "5" in the resulting symbol file 204.

In some examples, the file converter 110 may represent symbols as "Strings" type. In some examples, the file converter 110 may determine that it may be more efficient to convert one or more symbols from the structured data source file 200 into a different data type, such as a number or a timestamp (e.g., date and/or time information). In some examples, the different example data types of strings, number, timestamps, etc., may allow the data analysis service 106 to order symbols with greater efficiency. It may be appreciated that ordering the numbers as strings can produce a different result than using the actual number under alphanumeric ordering. For example, the numerical symbols shown in the symbol file 204 are sorted as numbers (1, 2, 3, . . . , 9, 11), rather than as strings, which would produce (1, 11, 2, 3 . . . ).

Additionally, it may be appreciated that by storing the symbols as strings, the symbols correspond to lossless representation of the original data. For example, a timestamp may be generated in a first format (e.g., YYYY MMM DD at HH:MM:SS am/pm), but the timestamp may be saved in a second format. By storing the timestamp as a symbol of data type string, all of the information of the generated timestamp may be retained. In contrast, by storing the timestamp as a different data type (e.g., such as a number of milliseconds after an epoch), some of the original information of the first format may be lost.

As another example, information that is stored as a string can be manipulated without having to re-encode the information. For example, when a column is generated, the information stored in the column may be stored as a string type. However, after the information is stored in the column, it may be realized that the information in the column corresponds to Internet Protocol (IP) addresses. In traditional systems, a new encoding procedure would be performed to convert the information into an IP address format. However, example techniques disclosed herein enable the information (e.g., the IP addresses) to be operated on while maintaining the string type of the information, thereby maintaining the lossless representation of the original information.

In some examples, once the symbols have been reduced and organized, the symbols may be concatenated with a delimiter. In the illustrated example of FIG. 2, the symbols in the symbol file 204 are separated by a vertical bar or pipe character "|". It may be appreciated that using the symbol delimiter to separate symbols may facilitate reducing the amount of information used to represent the symbols. For example, representing a symbol using Type, Length, Value (TLV) encoding may include one or more bytes to represent the data type of the symbol, one or more bytes to represent the length of the symbol, and N bytes to represent the actual symbol (e.g., two or more "extra" bytes to represent the actual symbol). In contrast, by representing a symbol as a string, the symbol may be represented using N bytes to represent the actual symbol and one extra byte to represent the delimiter symbol. The symbol delimiter may be unique in the context of the symbols, and may also be reduced during the compression operation. In some examples, each symbol in the symbol file 204 as well as localities in a locality file 206 of the converted file 202 may be represented in binary format (i.e., as a "0" or a "1") for improved compression.

The file converter 110 may generate the locality file 206 containing each location of each symbol. The locality file 206 represents the structure of the modeled source (e.g., raw data source). As used herein, the term "position" refers to a locality within the source file (and the mirrored localities in the locality file), which is distinguished from the term "location," which refers to a locality or coordinates within the symbol file. If a symbol is in the structured data source file 200 more than once, a new value (representing a symbol location) is added. As shown in FIG. 2, each symbol in the symbol file 204 has a corresponding location (within the symbol file). For example, the symbol "1" is located at location "01," the symbol "A" is located at location "09," and the symbol "L" is located at location "20" of the symbol file 204. The position (e.g., within the locality file 206) of a location value is a mirror of the structured data source file 200. In other words, the locality file 206 may be similar to the structured data source file 200 except that in place of the actual symbol, the locality file 206 includes a value representing the location of a particular symbol within the symbol file 204.

For example, at a first entry 206*a* of the locality file 206 (e.g., at the first row, first column), the locality file 206 comprises a location value "09" in place of the symbol "A" found in a corresponding position 200*c* in the structured data source file 200. In another example, at a second entry 206*b* of the locality file 206 (e.g., at the first row, third column), the locality file 206 comprises a location value "13" in place of the "E" symbol found in a corresponding position 200*d* in the structured data source file 200. In yet another example, the locality file 206 contains two instances of the location value "05" (e.g., at a third entry 206*c* and a fourth entry 206*d*) to represent the two separate occurrences of the symbol "5" in the structured data source file 200 (e.g., at the first entry 200*a* and the second entry 200*b*).

In some examples, a location value may be implemented as an integer value that is a simple index or offset relative to the symbol file 204. For example, a location value "01" represents a first-ordered position in the symbol file 204. In other examples, a location value may be coordinate values (e.g., x-y) of a symbol within structured data. In yet other examples, a location value may be an address of a symbol contained within the symbol file 204. In some examples, the location values may be fixed in size (i.e., expanded by adding prefix 0's), and/or represented in binary (i.e., as 0s and 1s). In some examples, using a fixed size for the location values may allow for a more efficient processing protocol because fixed size fields may have a reduced overhead. In other words, simplified math may be used to find a given symbol in a data source file.

In some examples, the analysis component 112 of FIG. 1 may generate a manifest file 210 that contains statistics about the structured data source file 200. For example, the analysis component 112 may generate, for each column of data, statistics such as cardinality (count), a sum value, a minimum value, a maximum value, an average (mean), a median value, and a standard deviation ("Std"). For example, the analysis component 112 may generate statistics for column 2 of the structured data source file 200 indicating a count of four records (rows) having data in that column, a sum total of 20, a minimum value of 1, a maximum value of 4, an average value of 2.5, a median value of 2.5, and a standard deviation of 1.12. It may be appreciated that the analysis component 112 may generate different statistics based on the type of data in a column. Statistics for columns containing string or text data may include text-search-related statistics, such as distance, correlation, and/or association. Although not shown in FIG. 2, in some examples, the manifest 210 may additionally or alternatively include information (e.g., metadata) regarding the converted file 202 and/or to the conversion process performed with respect to the structured data source file 200 and the converted file 202.

According to an aspect, the converted file format comprised of a symbol file and a locality file may be configured to support lossless compression. That is, the original source file (e.g., the structured data source file 200) can be recreated from the encoding in the converted file 202. For example, to reproduce the original data source, the locality file 206 can be scanned, each location value may be used as a lookup index in the symbol file 204, and the location value may be replaced with the retrieved symbol.

Aspects of the present disclosure may store and compress data in a more effective manner, such as closer to or at its theoretical minimum. For example, if a data source file is compressed using some standard compression tool, the resulting file may achieve the theoretical minimum associated with that particular algorithm. Unique to the example techniques disclosed herein is the ability to facilitate adaptive and/or intelligent organization of the derived locality file and symbol file such that the data source can be compressed "below" the theoretical minimum even when using the same compression algorithms. Additionally, in the data analytics world, additional information may be added to facilitate performing information retrieval. In some examples, this additional information overhead can be greater than the theoretical minimum the file could achieve and, at a larger data scale (e.g., a scale for big data), can be a tremendous cost. In some examples, the value of the incurred cost may be particularly large when cataloguing (i.e., indexing) is used to speed up ever increasing number of specific result set retrievals.

Figure 3A:
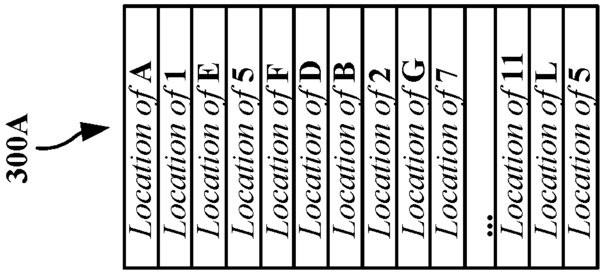
FIG. 3A depicts a representation of a locality file in a row-based orientation, in accordance with various aspects of the present disclosure.
Figure 3B:
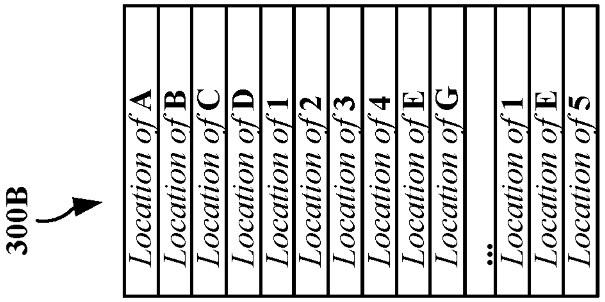
FIG. 3B depicts a representation of a locality file in a column-based orientation, in accordance with various aspects of the present disclosure.

In some aspects, the compression algorithms may have some difficulty finding patterns when the distance of those patterns is large or disjointed. As a result, the localities in a locality file may be ordered by a row or column orientation, as shown in FIGS. 3A and 3B, respectively, or even by diagonal orientation. FIG. 3A depicts one representation of a locality file 300A in a row-based orientation. For example, the locations of symbols in the first row of the structured data source file 200 are listed sequentially, followed by the locations of symbols in the second row of the structured data source file 200, and so forth. FIG. 3B depicts a representation of a locality file 300B in a column-based orientation. For example, the locations of symbols in the first column of the structured data source file 200 are listed sequentially, followed by the locations of symbols in the second column of the structured data source file 200, and so forth. In the illustrated example of FIGS. 3A and 3B, the location value is represented in generic terms such as "Location of A," for clarity of illustration.

Although the example of FIG. 2 provides examples of converting a structured data source file into an index file, it may be appreciated that the disclosed techniques may be applied to other data types. For example, the disclosed techniques may be applied to unstructured data, such as text data. In some examples, the disclosed techniques may be applied to structured data with text values. In some examples, the disclosed techniques may be applied to semi-structured data, such as a JSON files and XML, files.

Figure 4:
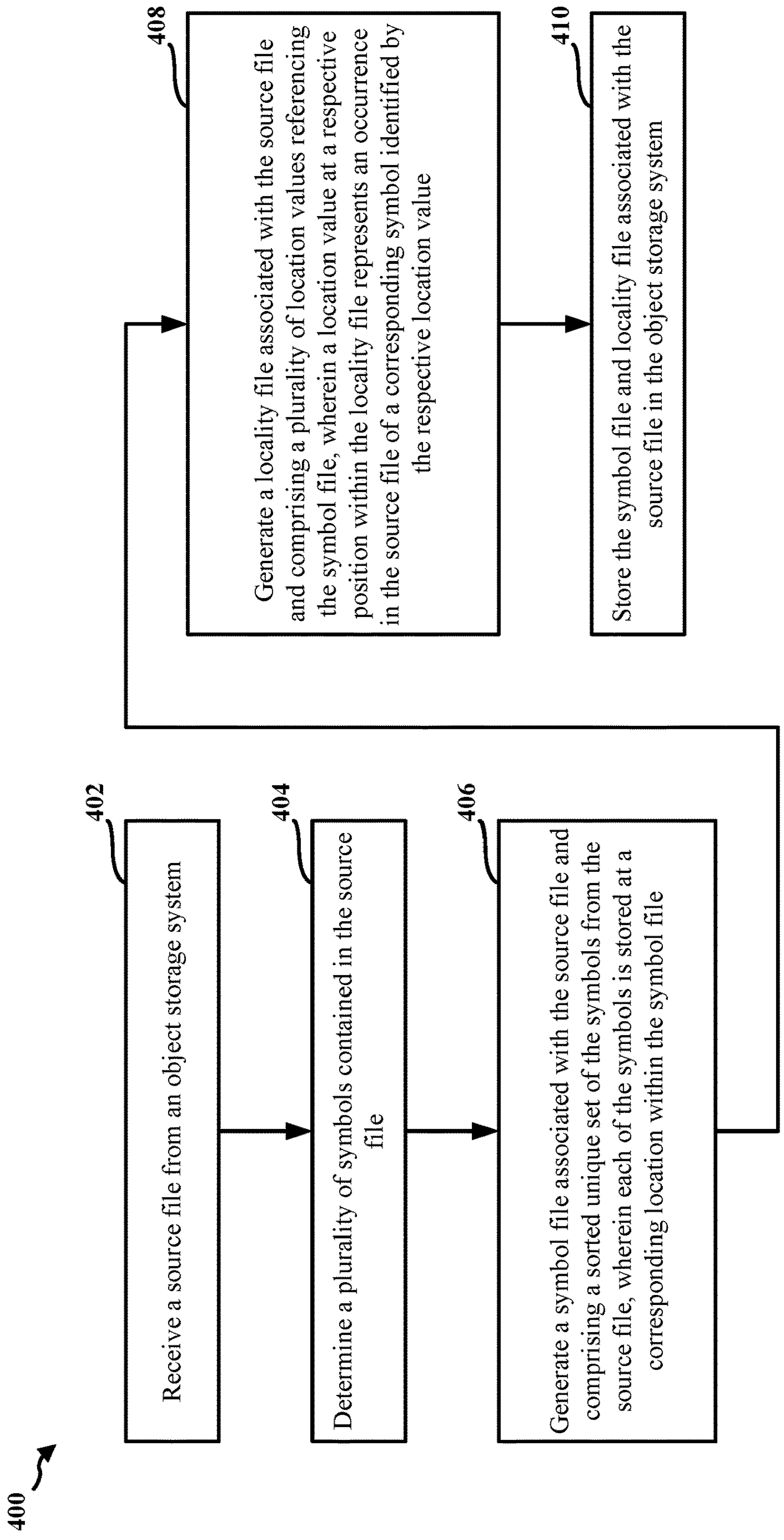
FIG. 4 is a flowchart illustrating a method for processing and storing a file in object storage, in accordance with various aspects of the present disclosure.

FIG. 4 is a flowchart illustrating a method 400 for processing and storing a file in object storage, in accordance with aspects presented herein. The method 400 may be performed by the data analysis service 106, by a component of the data analysis service 106, such as the file converter 110 and/or the analysis component 112, or by the object storage system 103. It is noted that the following description of the example method 400 refers to the example system 100 and components described above in connection with FIG. 1. The method 400 for processing and storing a file in object storage enables improved compression rates of object data due to the separation of symbol and locality.

At 402, the data analysis service 106 (e.g., using the file converter 110) receives, from the object storage system 103, one or more source files 115. In some examples, the receipt of the source files is triggered by user input that selects a bucket in which the source file is obtained. In some examples, a user may select the bucket for discovery and/or analysis. In some examples, the receipt of the source file is automatically triggered in response to detecting the creation of modification of the source file in object storage.

The file converter 110 may convert the received source files 115 to the converted file format to facilitate later discovery, refinement, and query operations. For example, FIG. 2 illustrates an example of conversion of a source file 200 having structured data, such as CSV files, into at least one symbol file 204 and at least one locality file 206 of a converted file 202.

At 404, the data analysis service 106 determines a plurality of symbols contained in the source file 115. For example, the file converter 110 may scan through the source file 115 to identify individual symbols contained in the source file 115. The file converter 110 may use predetermined character(s) as delimiters between symbols (e.g., such as white space).

At 406, the file converter 110 generates a symbol file 122 associated with the source file 115 and comprising a sorted unique set of the symbols from the source file 115. Each of the symbols may be stored at a corresponding location within the symbol file 115. In some examples, the sorted unique set of the symbols in the symbol file 122 are concatenated together with a delimiter.

At 408, the file converter 110 generates a locality file 124 associated with the source file 115 and comprising a plurality of location values referencing the symbol file 122. A location value at a respective position within the locality file 124 represents an occurrence in the source file 115 of a corresponding symbol identified by the respective location value. In some examples, the source file 115 may comprise structured data, and the location values may be ordered within the locality file 124 by one of a row orientation or a column orientation. For example, the source file 115 may comprise at least one of a comma-separated values (CSV) file having a plurality of records, each record comprising a plurality of fields separated by a delimiter character.

In some examples, the file converter 110 may identify a type of data contained in the source file 115. For example, the file converter 110 may identity the type of data based on a file extension of the file, based on metadata associated with the file identifying the type of data, or based on an inspection of the file itself. Responsive to determining that the source file 115 comprises unstructured text data, the file converter 110 may generate a plurality of fingerprint values based on the determined plurality of symbols contained in the source file 115. The file converter 110 may then generate the locality file 124 comprising the plurality of fingerprint values. A fingerprint value based on a corresponding symbol and at a respective position within the locality file may represent an occurrence in the source file 115 of the corresponding symbol.

In another aspect, responsive to determining that the source file 115 comprises semi-structured data, the file converter 110 may transform the semi-structured data into a two-dimensional structure prior to generating the locality file 124. For example, the source file 115 comprising semi-structured data may be formatted as at least one of a JavaScript Object Notation (JSON) file and an extensible markup language (XML) file.

At step 410, the file converter 110 stores the symbol file 122 and the locality file 124 associated with the source file 115 in the object storage system 103. In some aspects, the file converter 110 stores the symbol file 122 and the locality file 124 in a same bucket 108 as the source file 115 in the object storage system 103. In some aspects, the file converter 110 may generate a converted file 120 that comprises the symbol file concatenated with the locality file. In some aspects, the data analysis service 106 may search the source file 115 by querying the locality file 124 associated with the source file 115.

It may be appreciated that the example method 400 of FIG. 4 for processing and storing a file in object storage enables improved compression rates of object data due to the separation of symbol and locality. As described above, by separating the source file into a symbol file and a locality file, it may become more efficient to manage data in a data store (e.g., the object storage system 103). For example, data analysis, manipulation, and/or queries can be handled without decompressing the symbol file. Additionally, modifications may be made to the locality file to update the data in the source file.

Aspects of the present disclosure further provide techniques for materialization of data in object using the converted file format described herein. For example, disclosed techniques may index object storage where data is an object that can represent one or more entries (e.g., rows) and where these objects can be grouped together to make a dataset. The described techniques for data materialization provide an approach to manipulating indexed data, as well as resolving analytical text search and/or relational queries. That is, based on data indexing, the disclosed techniques provide the ability to quickly and easily transform and/or assemble answers for a request in a dynamic manner and at scale. The term "materialization" is used herein as the overarching name for both data virtualization and view materialization capabilities since all aspects of known extract, transform, and load (ETL) processes can be characterized as late materialization.

In an aspect, data materialization is the realization of a result set based on indexes, either fed by an initial representation and/or potential transformations to resolve a particular search request and/or query of data stored in object storage. A request can be a combination of predicates (e.g., database functions) referred to herein as a "query plan." In other words, a query plan can be a sequence of functions that take a dataset (e.g., an index) and sorts/reduces the dataset to a final (potentially smaller) result set.

Figure 5:
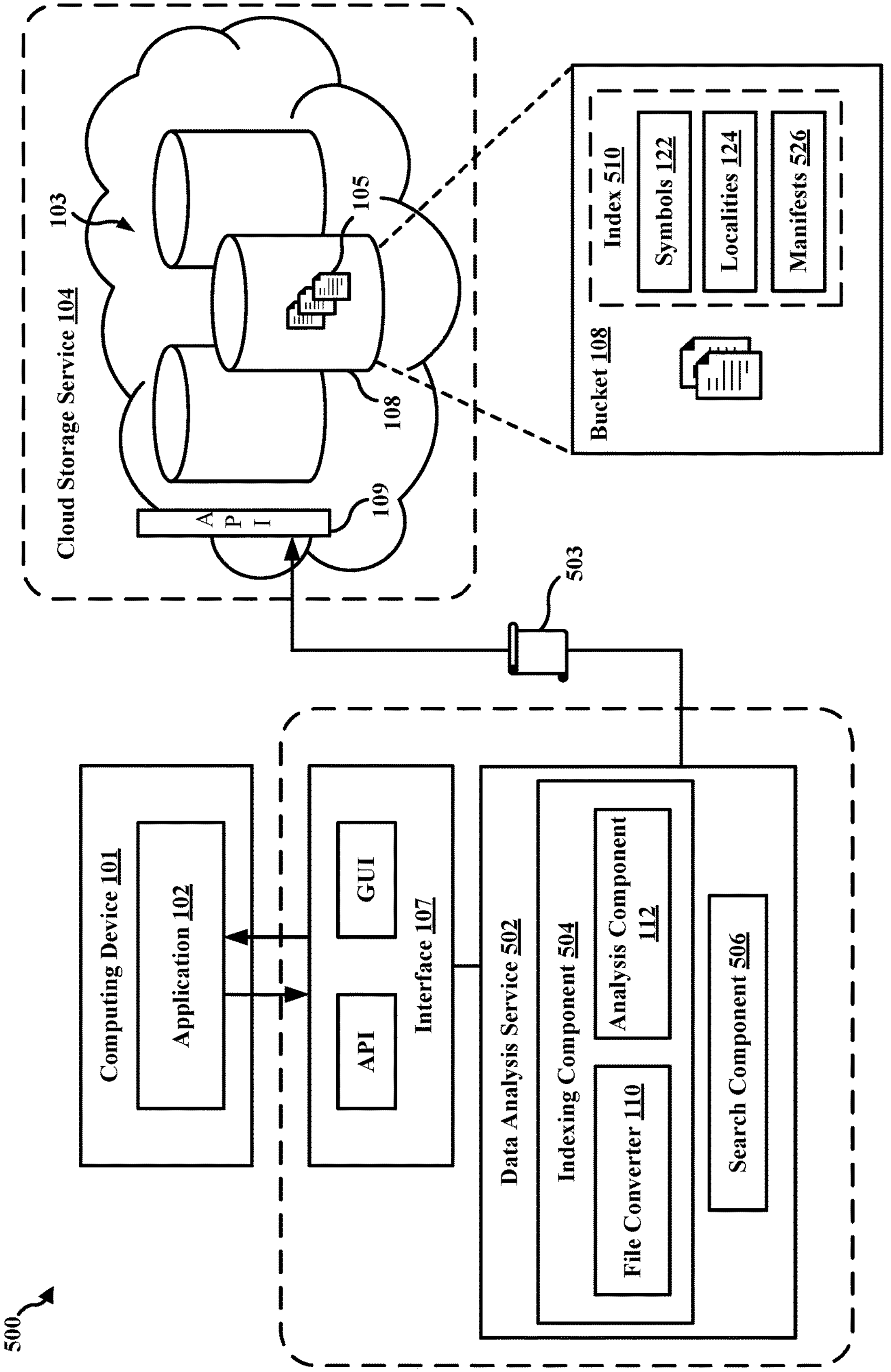
FIG. 5 is a block diagram illustrating a system for indexing and searching data stored in object storage, in accordance with various aspects of the present disclosure.

FIG. 5 is a block diagram illustrating a system 500 for indexing and searching data stored in object storage, as presented herein. The system 500 is similar to the system 100 described in connection with FIG. 1, except for the inclusion of several components to depict the data materialization and caching aspects in greater detail. Similar to the system 100 of FIG. 1, the system 500 includes a computing device 101 executing an application 102 that has stored data 105 in an object storage system 103. The object storage system 103 is configured to store units of data 105 as objects in a flat organization scheme with logical containers known as buckets 108.

The system 500 further includes a data analysis system 502, similar to the data analysis service 106. The data analysis service 502 is configured to process and analyze the data 105 stored in the object storage system 103. The data analysis service 502 includes an indexing component 504 configured to generate at least one index 510 based on one or more data sources (e.g., the data 105), which are similar to the converted files 120 of FIG. 1. In some aspects, the indexing component 504 may utilize the file converter 110 of FIG. 1 for processing one or more data sources with the object storage system 103 into the described converted file format. In some examples, the indexing component 504 may read the raw data from object storage, and create the indexes 510, which may then be stored back in object storage. In some examples, queries are processed based on the indexes and raw data may not be read to resolve any particular query request. In other cases, the indexing component 504 reads the raw data from another source (e.g., not object storage), and stores the resulting indexes in object storage. Although the example of FIG. 5 illustrates a single instance of the indexing component 504, it is understood that the operations of the described techniques are able to be performed by a distributed system in parallel. For example, the system 500 may execute multiple instances of the indexing component 504 to convert a large amount of data in object storage 103 to the described converted format.

The index 510 is an indexed form of the one or more data sources. In some aspects, the indexing component 504 may utilize the analysis component 112 of FIG. 1 for analyzing one or more data sources and generating statistical information (e.g., a manifest portion). In an aspect, the index 510 includes at least one manifest portion 526, one or more symbol portions 122, and one or more locality portions 124.

The manifest portion 526 contains schema information, statistics, metrics, and other metadata related to the original data source(s), to the index, and to the indexing processing performed. The symbol portions 122 contain all the symbols found in a data source file (e.g., ordered internally). The locality portions 124 contain values representing the respective locations of those symbols in the original data sources (i.e., raw/refined source). As described in greater detail below, the combination of the manifest file, the symbol file, and the locality files may be used to optimize access to object storage, where each component file is used to resolve a materialization request with reduced time, size, and cost metrics (i.e., how long does it take to index a data source, of what size is the resulting index, and at what cost) compared to known techniques. As described later, during the indexing process, a root and branch type data structure can be generated to summarize multiple manifest files 526 of a single index, such that several manifest files are combined or summarized into leaf nodes.

In one aspect, the manifest file(s) 526 may include statistics and metrics about the indexed data, which were compiled during the indexing process, and may be updated as a result of any refinement or transformation operations performed on the index. Such statistics provide enough information to either resolve a specific request and/or scope (i.e., reduce) object storage access, without accessing the underlying symbol files, locality files, or raw source data, or at least with reduced accesses compared to the known techniques. The statistics may include information about the type or format of a source file 115 (e.g., CSV, JSON, XML, log file, etc.), and information indicating the type(s) of data in the source file 115 (e.g., structured, semi-structured, unstructured, Strings, Numbers, text data). The statistics may further specify any structure(s) in the data sources. In an aspect, the statistics may specify, for each column of data in the underlying data source, a "minimum" and/or "maximum" symbols that are the symbols that would be first in sequence and last in sequence, respectively, if all the symbols in a data range (e.g., a particular column) were in a sorted order. In one aspect, the analysis component 112 may calculate statistical functions of the source data, such as the minimum, maximum, average, mean, cardinality, standard deviation, and count of a particular column in the data source. Based on statistics, the analysis component 112 may be configured to derive a scheme of a data source, such as a type of column (e.g., string, integer, time), or a name of a column if the data matches a particular format (e.g., time, email, URL).

The data analysis service 502 publishes the indexed data source(s) to support execution of analytics and search queries, such as text searches and relational queries. For example, the indexing component 504 may index the source data in the form of an index 510 to support the execution of text search and relational queries on that data, which is not conventionally available in object storage systems. In some examples, the index 510 may be defined, in part, by an internal schema and sort order (e.g., as specified in the manifest portion 526) thereby providing materialization features to the data stored in object storage. In some examples, the data analysis service 502 may publish the indexed data source(s) as a virtual bucket, which may be configured similar to the physical buckets 108.

In one aspect, the data analysis service 502 may provide a graphical user interface that displays the data sources stored in object storage and that provides an interface through which a user can analyze and run queries on the data sources. The graphical user interface of the data analysis service 502 may enable a user to access the data sources contained in an index 510, rather than be limited to displaying the content of each of the individual physical buckets 108. After data source(s) have been indexed and published, the data analysis service 502 may use the indexes to display statistics related to the underlying data sources, as well as provide user interface elements for the submission of a search query to be executed on the data index.

In an aspect, the data analysis service 502 may create the initial data edge index 510 of object data having a schema and sort order corresponding to the lossless state of the original raw sources (i.e., data 105). In other words, the materialization of this index, which is akin to a relational database generalized selection (i.e., "SELECT *"), will reproduce the exact raw source state of data 105.

In another aspect, each index 510 may be refined using one more transformation operations, which can be seen as a new index that can be analyzed and/or used as another index to be refined again. For example, an index 510 may be transformed by a change in schema types (i.e., columns), a change in schema type names, a change in the order or shape of the schema, a change in the data set sort order by type, or an aggregation or correlation between two or more indexes 510. The transformed index may be implemented by a modification to the existing manifest or creation of a new manifest, while the linked-to symbol files and locality files remain unchanged. In an aspect, transformations may be considered as descriptions where each description can be applied in sequence to produce the desired data set. Each transformation operation may be executed on-demand. That is, a new manifest file that describes or specifies new transformations, aggregations, correlations, or sort orders, and any combination thereof can be executed on the symbol files and the locality files dynamically and in a desired sequence to produce a particular data set.

As shown in FIG. 5, the system 500 includes a search component 506 configured to receive one or more search queries 503 for the data stored in one or more indexes 510. In some aspects, a search query may be one of a relational query and a text search. The search component 506 is configured to execute the search queries 503 on data using the index 510, including an analysis of the manifest portions 526, the symbol portion(s) 122, and the locality portion(s) 124. The unique arrangement and structure of the data structures in the index 510 advantageously enable the described system to quickly perform such operations on data stored in object storage compared to known techniques.

As an overview, the search component 506 may use the symbol files 122 to determine if a word and/or phrase is present within the indexed data, and may use the locality files 124 to determine the structure of the resulting dataset. Searching the symbol files 122 may involve performing a binary search, unique scanning, and/or other suitable search algorithms. As discussed below, the symbol files 122 contain a number of times (i.e., hits) a symbol exists in the associated locality file 124. If no wildcards are contained in the search query 503, the search component 506 may perform a binary search to find/search for the existence of the specified symbol in the symbol file 122. If wildcards are contained in the search query 503, the search component 506 may perform a binary search to process a prefix portion of the search query 503 (i.e., the search term up to the wildcard), and may then perform unique scanning to handle the remainder of the search term. Prefix wildcarding includes unique/optimized scanning that the performed scanning may be unique because it is a stream-based or bit-based search without restart, and because it hits a threshold of collections. Thresholds may be applied to stop location collection and to proceed to the locality file 124 to continue the scan.

In an aspect, the search component 506 is configured to execute one or more search queries 503 for the analysis of data in an index 510, including text search and relational queries. Each of these aspects can be used to feed the other as part of a query plan. For example, the search component 506 may use a text search operation to first filter a large dataset into entries that can be analyzed via relational functions. In an aspect, the search component 506 may execute a text search having a term matching clause, a wildcard matching clause, and/or one or more Boolean operators on a virtual bucket of data stored in object storage using the manifest portion 526 and/or the symbol portions 122 of the index 510. For example, the search component 506 may execute a text search that includes a term matching clause specifying a text term (e.g., a string literal, text value) and returns a result set from data stored in object storage that matches the specified text term. As used herein, the data stored in object storage includes converted files (e.g., the example converted files 120 of FIG. 1) stored in object storage and that represent the actual raw data in object storage. In another example, the search component 506 may execute a text search that includes a wildcard matching clause that specifies a search expression having a wildcard and returns a result set from data stored in object storage that satisfies the search expression. In another aspect, the search component 506 may execute a relational query on data stored in object storage using the manifest files 526, symbol file(s), and locality file(s) of the associated index 510. Example relational functions of a relational query that the search component 506 may execute include a SELECT, DISTINCT, ORDER BY, GROUP BY, RANGE BY, FIND UNTIL, and INNER JOIN operation as well as text search functions such as match, match phrase (e.g., for matching exact phrases or word proximity matches), multi match (e.g., for multi-field queries), range (e.g., for matching documents with fields that have terms within a particular range), text search include/exclude operations, and wildcard (*) operators. Each relational function can be combined with any other function to create a query plan to resolve both text search and/or relational query, or any combination thereof.

In one aspect, the search component 506 may be configured to drive access through a workflow that includes a sequence of manifest file, then symbol file, then locality file of an index. Such an approach improves the functioning of existing search and analysis systems by decreasing or limiting the amount of object storage access requests that are employed to resolve a materialization. The search component 506 may use the manifest file 526 to first scope the symbol files 122, which are then used to scope the locality files 124. That is, the manifest files 526 may be used to determine where the data is, which then allows the search component 506 to efficiently fetch the particular symbol files 122 and/or locality files 124 that can answer a request. In some examples, parsing the manifest files 526 may enable the search component 506 to answer particular requests (using the metadata and statistics contained in the manifest files 526) without retrieving or accessing the symbol files 122 and/or the locality files 124. In other cases, the search component 506 may first access the manifest file 526 and then access the locality file 124 (e.g., without accessing the symbol files 122), for example, in situations in which particular symbol materialization is not needed. That is, in cases in which symbol files are used (e.g., only needed) to materialize the result set (i.e., locality to symbol mappings), the accessing of the symbol files 122 can be skipped.

Figure 6:
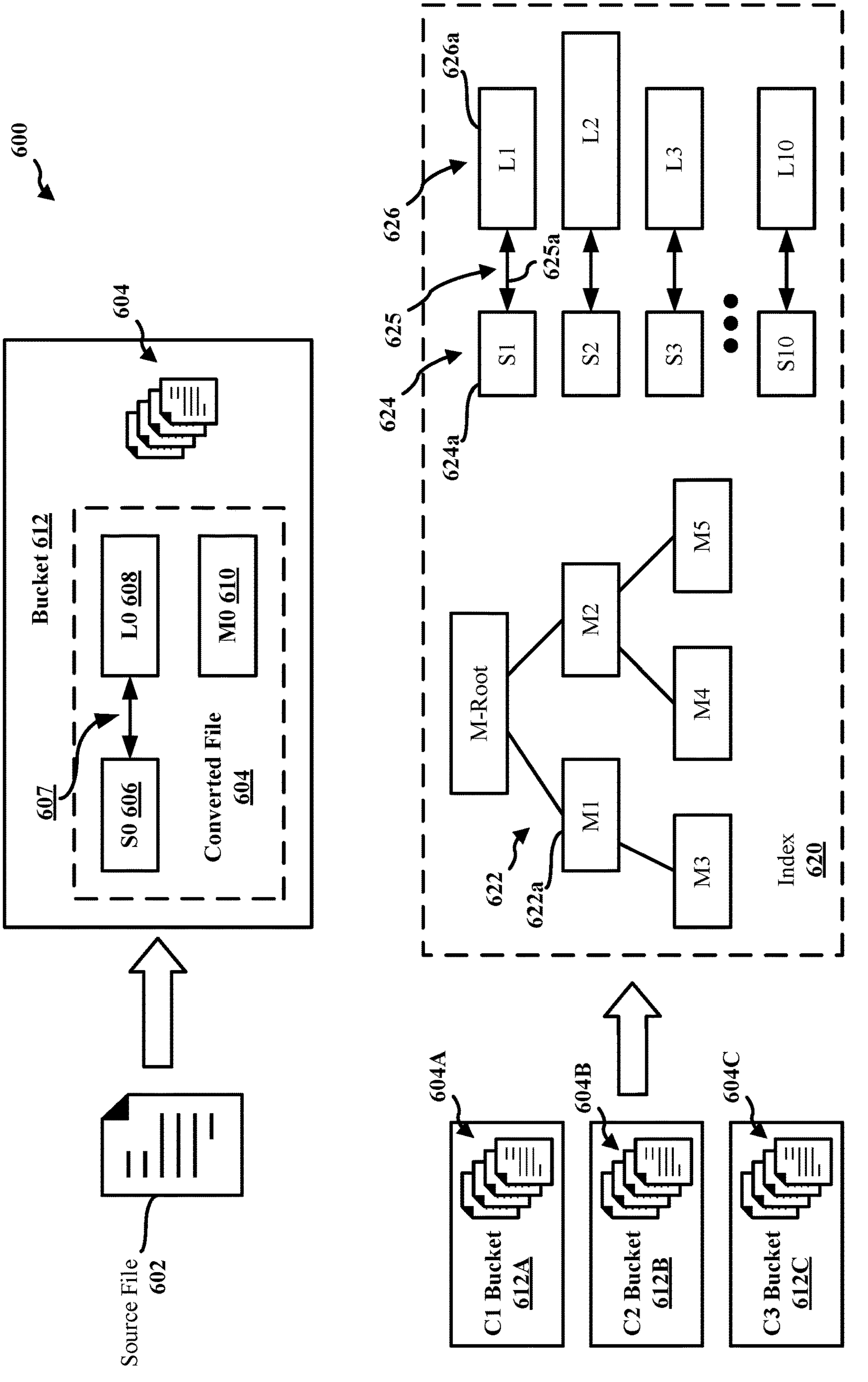
FIG. 6 is a block diagram depicting the indexing of data stored in object storage, in accordance with various aspects of the present disclosure.

FIG. 6 is a block diagram 600 depicting the indexing of data stored in object storage, as presented herein. In the example shown in FIG. 6, the data analysis service 502 may convert a source file 602 into a converted file 604. For example, the file converter 110 of FIG. 5 may create a symbol file 606 ("S0") associated with the source file 602 that contains each unique symbol found in the source file 602. The file converter 110 may also generate a locality file 608 ("L0") containing each location of each symbol. The analysis component 112 of FIG. 5 may generate a manifest file 610 ("M0") that contains statistics about the source file 602. The data analysis service 502 may store the converted file 604 in a bucket 612 of object storage. The bucket 612 may comprise one or more converted files 604.

In some examples, the data analysis service 502 may generate an index based on processing of data objects associated with a bucket, such as the example bucket 612. For example, the indexing component 504 of FIG. 5 may generate an index based on the processing of the converted files 604 associated with the bucket 612. In some examples, the data analysis service 502 may generate an index based on the processing of data objects associated with multiple buckets.

For example, and as shown in FIG. 5, the indexing component 504 may generate an index 620 based on processing of data objects associated with a first bucket 612A (e.g., based on the processing of converted files 604A), based on processing of data objects associated with a second bucket 612B (e.g., based on the processing of converted files 604B), and based on processing of data objects associated with a third bucket 612C (e.g., based on the processing of converted files 604C).

As an illustrative example, each of the buckets 612A-612C may be associated with different respective companies. For example, the first bucket 612A may comprise data objects (e.g., the converted files 604A) associated with a first company ("C1"), the second bucket 612B may comprise data objects (e.g., the converted files 604B) associated with a second company ("C2"), and the third bucket 612C (e.g., the converted files 604C) may comprise data objects associated with a third company ("C3").

It may be appreciated that the indexing component 504 may process the data objects associated with a bucket (e.g., all of the data objects associated with the bucket) or may process a subset of data objects associated with a bucket. For example, the indexing component 504 may generate the index 620 based on data objects comprising a data type of only CSV files associated with each of the respective buckets 612A, 612B, 612C. In another example, the indexing component 504 may generate the index 620 based on the data objects of the CSV files that include customer information. For example, the relevant data objects associated with the first bucket 612A may include the following data source files: "C1-customers.1.csv", "C1-customers.2.csv", and "C1-customers.3.csv".

As shown in FIG. 6, the index 620 may include at least one manifest file 622 that describes the processing used to create the index 620 as well as the schema. For example, the index 620 may include a manifest file that describes that the data objects correspond to a data type of CSV files that include customer information. Using the customer CSV example, the indexing component 504 may generate a manifest that specifies a source schema of the data source files having six example files: (1) First Name (String); (2) Last Name (String); (3) Street (String); (4) State (String); (5) Sex (String); and (6) Age (Number).

In an aspect the manifest file 622 includes statistics and metrics about the indexed data, which were compiled during the indexing process. In some aspects, the manifest file 622 may be updated as a result of any refinement or transformation operations performed on the index 610, which may result in the creation of a new manifest.

In some aspects, the manifest file describes the associated manifest, symbol file(s), and locality file(s). For example, in cases where the index is comprised of multiple pairs of symbol files and locality files, the manifest file may specify which of the symbol files is associated with which of the locality files, and that they represent which raw data source (e.g., original CSV file). In the illustrated example of FIG. 6, a mapping 607, 625 between a symbol file and the associated locality file is shown using bi-directional arrows.

For example, with respect to the converted file 604, the M0 manifest file 610 may specify that the S0 symbol file 606 is associated with the L0 locality file 608 (e.g., via a mapping 607), and that the files 606, 608 represent the source file 602. In another example, and with respect to the index 620, an M1 manifest file 622*a* may specify that an S1 symbol file 624*a* is associated with an L1 locality file 626*a* (e.g., via a mapping 625*a*).

In one implementation, a symbol file and locality file pairing may be represented and encoded using a common file name prefix. For example, the S0 symbol file 606 and the L0 locality file 608 may be represented and encoded using a common file name prefix "srcfile1" (e.g., the S0 symbol file 606 may be represented and encoded as "srcfile1.I2S" and the L0 locality file 608 may be represented and encoded as "srcfile1.L2I").

The example index 620 may include one or more symbol files 624 (e.g., "filename.I2S") that each contain the symbols of the indexed data sources. In some aspects, the symbol file 624 may be arranged similar to the symbol files 122 described in connection with FIG. 1 and/or FIG. 5, and may be extended to include information relating to a number of hits. The number of hits specifies the number of times a given symbol occurs within a locality file. In other words, a symbol file has one reference and hits indicate how many times this symbol appears in the locality file (i.e., original raw data representation). The symbol file 624 may have a format of <symbol>:<count>:<delimiter>, <symbol>:<count>:<delimiter>, etc. For example, the example symbol file 204 of FIG. 2 may be extended to include a number of hits and a portion of the extended symbol file corresponding to the locations 4 to 6 may comprise "4:1|5:2|7:1".

In an aspect, the search component 506 may perform a symbol lookup on the symbol files 624 for text search and relational queries, for example, to determine a given data source satisfies the text search or criteria of the relational query. In one implementation, the search component 506 may perform a lookup using a binary search algorithm on the ordered listing of symbols in the symbol file to determine whether the underlying data source satisfies text search criteria. For example, to initiate a SEARCH operation for a given text string input, the search component 506 can efficiently perform a search (e.g., a binary search) of the symbols in the symbol file 624 without having to determine the position or location (if any) of the searched-for symbol in the raw data. Thus, the index enables an improved search of data in object storage by providing a threshold question of whether a symbol is present in the index prior to resolving the remainder of the result set. When final materialization is performed subsequent to the final result set being resolved, then the associated locality files can be used in the materialization process to re-create the raw data that satisfied the search queries as the result set.

The index 620 may further include one or more locality files 626 (e.g., "filename.L2I") that each specify the locality of the indexed data source (e.g., where symbols are located). In an aspect, the locality files 626 may be organized into one or more locality rows having a hidden key to represent ordering of the raw or refined data source. In an aspect, the locality files do not contain physical hidden keys, but rather this is a logical concept implemented during execution of searches and queries. The hidden key is a physical order of the raw data indexed, or the logical order based on some searches and/or queries. During searches and/or queries, an array of positions (i.e., a virtual column) is ordered and/or reduced based on the search/query. Once the final array is created (based on the search/query predicates), the array can be used to materialize the results via the locality files and symbol files. The search component 506 may execute a query plan having relational operations or clauses that finalize a returned result set (e.g., ORDER, GROUP, JOIN) using the locality files 626 and without requiring the use of the symbol files 624. In an aspect, such relational operations (e.g., ORDER, GROUP, JOIN) work on the specific column localities. For example, only locality files (and not symbol files) may be used to do an ORDER, GROUP, or JOIN operation(s), until the final materialization is performed to resolve the final result set, at which point, the associated symbol files are used. As discussed above, the same applies to operations such as SEARCH where symbol files may be used (and not locality files), and when the final materialization is performed, then the associated localities may be used.

In an aspect, in response to receiving a search query to execute on the index 610, the search component 506 may be configured to generate a query plan or query execution plan comprising one or more predicates. Each query plan starts with scoping, then the creation of key localities based on the hidden key, that is continually sorted and/or reduced based on database functions, to ultimately be materialized via the symbol and locality files. In one aspect, the search component 506 may process the search query such that each predicate sorts or reduces a hidden key localities array to drive a next predicate. This final hidden key localities array may be used to finalize materialization via the symbol files and the locality files. Accordingly, query planning and its associated database functions are highly optimized due to the hidden key locality information. This information is small and allows for parallel and distributed execution.

Any aspect of the indexing can be changed dynamically. For instance, the size of the symbol files and/or the locality files can be increased, decreased, split, or merged to produce optimal sizes for requested access to the object storage system. For instance, the data analysis system may detect whether two or more index sets have common or related information, and may merge them together to reduce duplication, entropy, and the number of symbol-locality pairs. Merging is dependent on the particular data set indexed, but can greatly reduce the size of the overall logical index, as well as the number of object storage requests to materialize the original dataset.

Referring again to FIG. 6, the manifest file(s) 622 of the index 620 can be arranged in a tree-like data structure that summarizes portions of the manifest for faster access and query execution. In an aspect, for each logical index, there may be a root manifest file (i.e., "M-Root") that describes the topology of the dataset. Manifest files can be summarized and reference other "leaf" manifest files, which can represent an amount of raw data up to a threshold limit (e.g., 100 GB). For example, as each data source (e.g., the source file 602 and/or the converted files 604) is indexed, it is "chunked" into segments. These segments are mapped to their own corresponding manifest (e.g., leaf manifest files) that describes the true physical shape (i.e., "source of truth") such that a master manifest (e.g., the root manifest file) is different from a sub-segment manifest.

The manifest files are configured to scope requests to resolve a particular search and/or query. In other words, the manifest files may be used to determine whether a particular symbol and locality file pair does not have information related to a specific request. The use of such manifest files greatly reduces the number of object storage system access requests that the data analysis service 502 needs to materialize a result.

In some cases, one summarized manifest file may determine that a particular search or query result set was not in the index 620, and with one object storage request (e.g., an S3 request) resolve the request. In other cases, leaf manifest files can be utilized where a large dataset (e.g., 1 TB of log files) may have at least 10 to 100 MB file accesses to determine whether part of an index set is used (e.g., required) to materialize the result. Therefore, only 1 to 10 access requests of the object storage system is needed to resolve a "non-existent" request. When determining if a symbol is within a symbol and locality file pair via a text search or range within a relational query, the manifest file can also quickly scope such requests. It may be noted that manifest files can be used to not just scope requests, but also to actually resolve a particular search/query based on the internal metadata stored in the manifest file itself.

The next step in scoping is a type of query plan optimization type that includes analysis of whether a particular symbol and locality file pair is required. The search component 506 may access one or more manifest files or symbol files (which are typically a fraction of the size of the locality file) to determine if the overall pair of symbol files and locality files would be used to materialize a result set. In some aspects, the scoping may be driven via manifest file to symbol file to locality file existence-based optimizations. In other words, if it is determined that a symbol file needs to be accessed, it may be concluded that there is a high likelihood that the symbol and locality file pair is required to materialize. For example, if a query or search includes a FIND/UNTIL operation for a particular symbol, the search component 506 may determine that the particular symbol is outside of the scope of symbols within a particular symbol and locality file pair, as defined by minimum and maximum statistics found in the manifest file associated with that particular symbol and locality file pair. In response, the search component 506 can refrain or otherwise exclude from processing the associated symbol file and locality file.

In one aspect, the index 620 may be configured as a distributed index. For example, the index 620 may be arranged in a distributed manner (and not in a monolithic manner) in which the plurality of manifest files, symbol files, and locality files are stored across a plurality of physical buckets within object storage, such as the example buckets 612A, 612B, 612C associated with the index 620. The disclosed indexing techniques can naturally shard or partition without having to specify sharding constraints as in in other technologies. In some aspects, the converted files can be linked or merged to reduce entropy/duplications of information, for example, by merging data edge pairs.

The power of a distributed index (e.g., as shown in connection with the example buckets 612A, 612B, 612C associated with the index 620) is the ability to index data sources in parallel without reorganizing once the indexing is complete. In some aspects, the data analysis service 502 may execute multiple instances of the indexing component 504 on different worker nodes which process in parallel the raw data sources stored in object storage into symbol files and locality files. A manifest is created at the end that logically "links" the manifest/locality/symbol (M/L/S) pairs. Note that each worker (i.e., instance of an indexing component 504) creates many M/L/S pairs linking the subset to be ultimately linked across all subsets during a final completion. For example, one instance of the indexing component 504 may convert the raw data sources in the first bucket 612A to the corresponding symbol files S1, S2, S3 and locality files L1, L2, L3, while concurrently another instance of the indexing component 504 may convert the raw data sources in another different bucket (e.g., the second bucket 612B) to the corresponding symbol files S4, S5 and locality files L4, L5. Once a worker has completed converting the raw data sources in a particular bucket (e.g., the first bucket 612A) and has created a local manifest file (M1) for that bucket, the indexing component 504 may link this "branch" of the index to the root manifest file (M-Root), for example, by inserting an entry into the root manifest file with a reference to that local manifest file M1. The root manifest file could be stored in one of these buckets 612A, 612B or in another bucket entirely. This process of building a distributed index is improved over a traditional database with shards because the monolithic index of the traditional database (e.g., typically a b-tree data structure) are merged or ordered due to monolithic or complete order constraints.

Aspects of the described techniques have been configured to optimize around the number of accesses of the object storage system 103. In other words, the data analysis service 502 has been optimized to find information efficiently. The data analysis service 502 internally orders information and can naturally reproduce the original data source order. However, for any relational query requests where multiple columns can define a key specification (i.e., sort order), the locality file may be used (e.g., and not the symbol file), and the symbol file may be used for the final materialization. Therefore, to sort a section of a large dataset (e.g., 1 TB of log files), the scoping will have direct access to the symbol and locality file pairs to resolve the request, where locality files will be first ordered/grouped and symbol files will be used to materialize. The data analysis service 502 also uniquely performs aggregations during this materialization phase.

Figure 7:
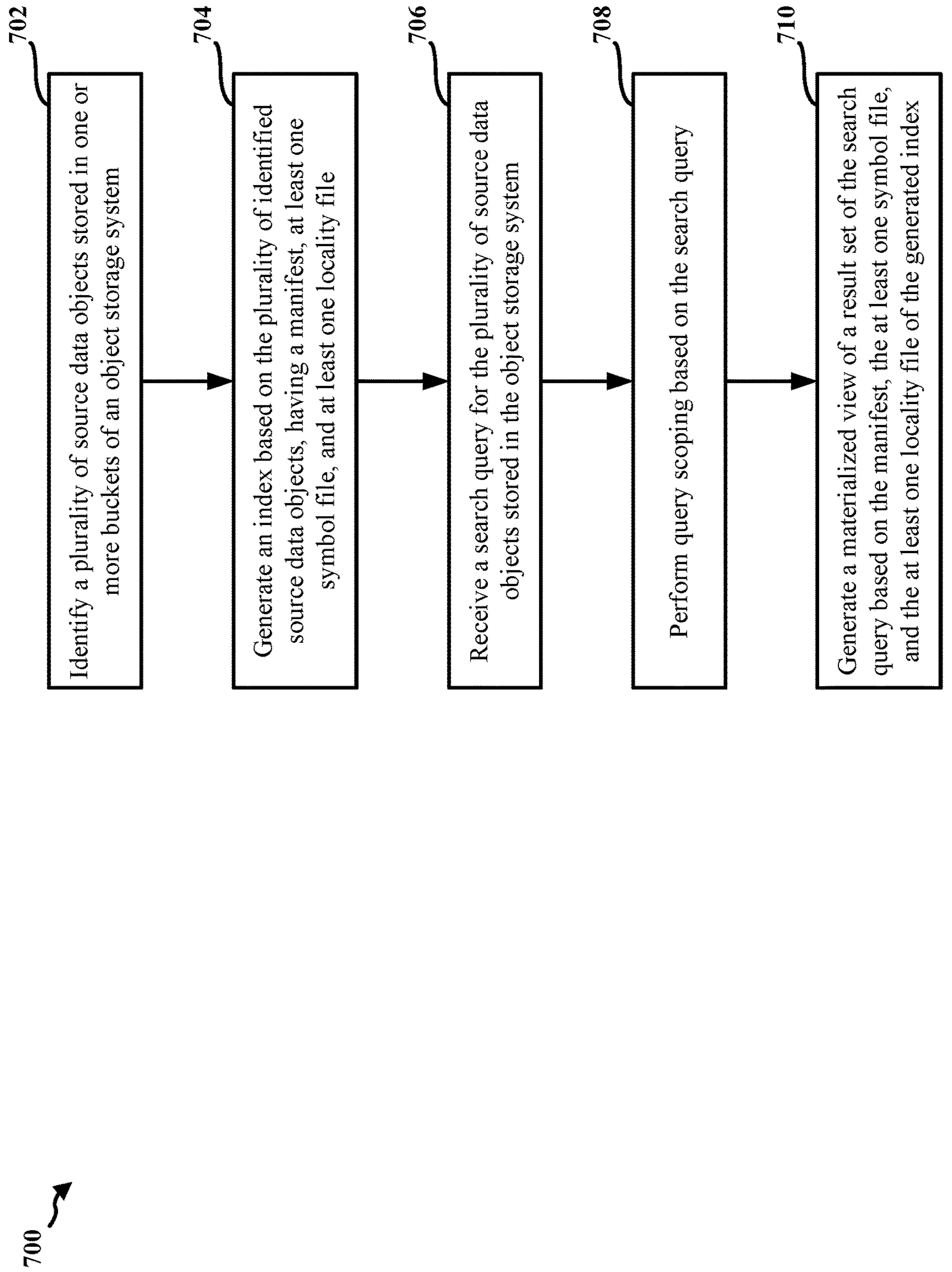
FIG. 7 is a flowchart illustrating a method for searching and querying data in object storage, in accordance with various aspects of the present disclosure.

FIG. 7 is a flowchart illustrating a method 700 for searching and querying data in object storage, as presented herein. The method 700 may be performed by the data analysis service 502, by a sub-component of the data analysis service 502, such as the indexing component 504 or the search component 506, or by the object storage system 103. It is noted that the following description of the example method 700 refers to the example system 500 and components described above in connection with FIG. 5. The method 700 enables text search and analytics queries to be performed on object storage without the expense and additional storage costs of prior approaches, such as data warehousing and ETL processes.

The method 700 begins at step 702, in which a plurality of source data objects stored in one or more buckets of an object storage system is identified. In some aspects, the identified plurality of source data objects is determined based on a grouping specifying a criteria for inclusion in the index. For example, and referring to the example of FIG. 6, the index 620 is based on data objects associated with a data type of CSV files. In some aspects, the source data objects are identified by user input that selects a bucket in which the source data objects are contained. In some use cases, the user may select the bucket for discovery, analysis, and/or indexing. In other aspects, the source data objects are automatically triggered in response to detecting the creation or modification of the data objects in object storage.

At step 704, the indexing component 504 may generate an index based on the plurality of identified source data objects. In an aspect, the index includes a manifest, at least one symbol file, and at least one locality file, as described in connection with the at least one manifest file 622, the one or more symbol files 624, and the one or more locality files 626 of FIG. 6. The manifest may specify a mapping of the at least one symbol file to the corresponding at least one locality file, as described in connection with the mappings 607, 625 of FIG. 6. In some aspects, the manifest may include a tree-like data structure of leaf manifest files having a root manifest file that summarizes at least one of the leaf manifest files. In an aspect, the symbol file is associated with a first data object of the plurality of source data objects and comprises a sorted unique set of the symbols from the first data object. In some such examples, each of the symbols may be stored at a corresponding location within the symbol file. The locality file that is mapped to the symbol file includes a plurality of location values referencing the corresponding symbol file. A location value at a respective position within the locality file may represent an occurrence in the first data object of a corresponding symbol identified by the respective location value.

At step 706, the data analysis service 502 may receive a search query for the plurality of source data objects stored in the object storage system. For example, the data analysis service 502 may receive the search query 503. In some aspects, the search query may be one of a relational query and a text search.

At step 708, the data analysis service 502 performs query scoping based on the search query. For example, the search component 506 may perform the query scoping to reduce object storage access. In some examples, the search component 506 may parse the manifest files 622 of the index 620 to resolve the search query. For example, when determining if a symbol is within a symbol and locality file pair via a text search or range within a relational query, the manifest files 622 can quickly scope such requests.

In some aspects, the query scoping may be driven via manifest file to symbol file to locality file existence-based optimizations. In other words, if it is determined that a symbol file is to be accessed, it may be concluded that there is a high likelihood that the symbol and locality file pair is required to materialize. For example, if a query or search includes a FIND/UNTIL operation for a particular symbol, the search component 506 may determine that the particular symbol is outside of the scope of symbols within a particular symbol and locality file pair, as defined by minimum and maximum statistics found in the manifest file associated with that particular symbol and locality file pair. In response, the search component 506 can refrain or otherwise exclude from processing the associated symbol file and locality file.

At step 710, the data analysis service 502 generates a materialized view of a result set of the search query based on the manifest, the at least one symbol file, and the at least one locality file of the generated index. In an aspect, the materialized view may be a matrix of columns and rows of data representing an ordered/reduced dataset of one or more converted file matrices of columns and rows. In some aspects, the data analysis service 502 may query the generated index in a sequence order comprised of the manifest, the at least one symbol file, and the at least one locality file. In some aspects, the data analysis service 502 may use the locality file and the symbol file to return a result set based on the location of the symbols in the data source file.

Resolving a search query may include scoping of work and then executing the work. The scoping of work may include identifying specific items of execution. The executing of work may include performing the identified specific items of execution.

As described above, as a data source is indexed, the data sources are "chunked" into segments. When an index becomes large, the number of segments also increases. For example, an index in the order of petabytes may include thousands of segments (e.g., tens of thousands of segments, hundreds of thousands of segments, etc.). The scoping of work in an index (e.g., the identifying of the segment(s) of the index that may resolve the search query) may take seconds, and for a large index (e.g., an index in the order of petabytes), the scoping of work may take upwards of ten seconds. Thus, it may be appreciated that reducing the scoping of work to sub-seconds is beneficial in improving query performance.

Figure 8:
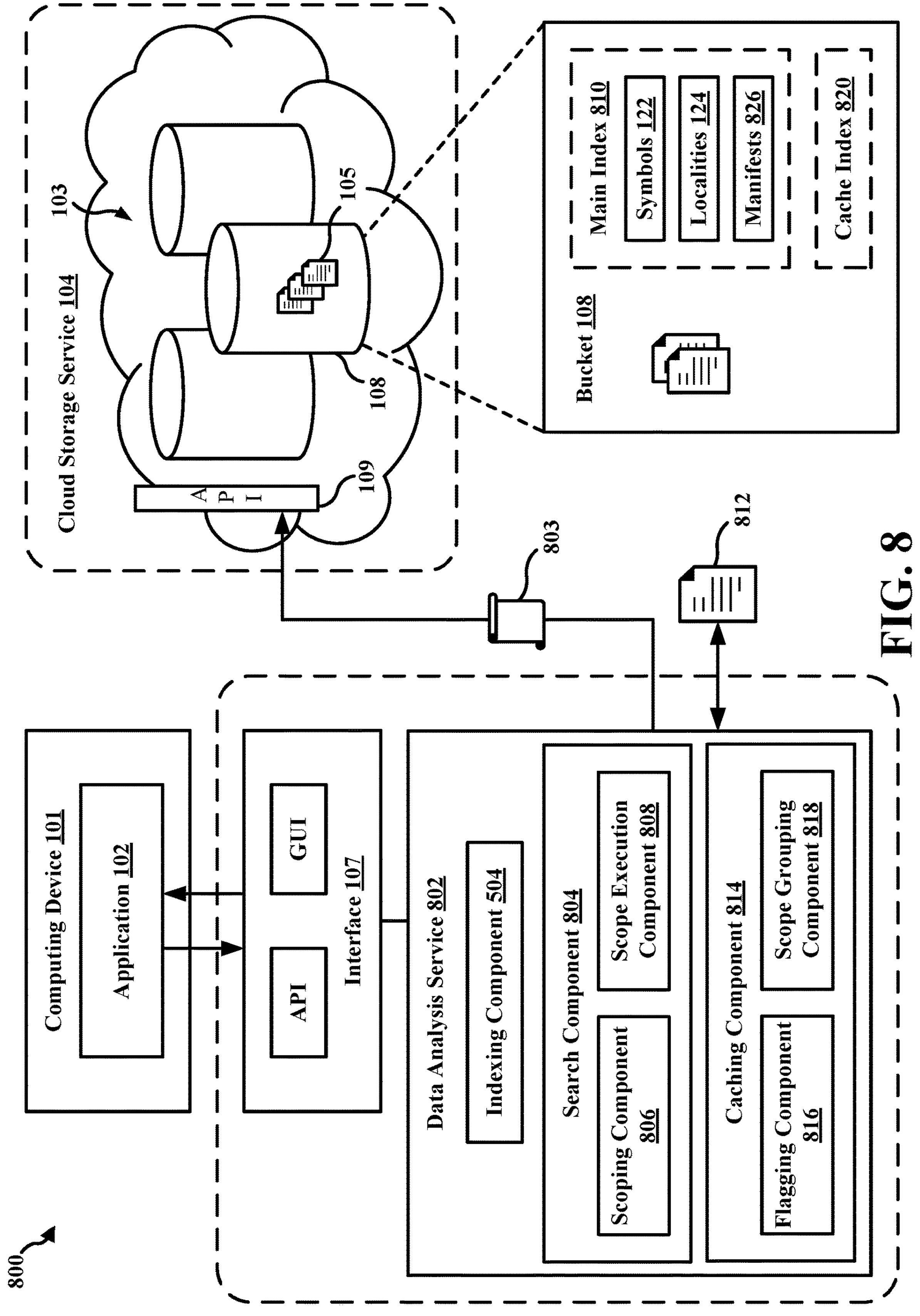
FIG. 8 is a block diagram illustrating a system for indexing, searching, and caching data stored in object storage, in accordance with various aspects of the present disclosure.

FIG. 8 is a block diagram illustrating a system 800 for indexing, searching, and caching data stored in object storage, as presented herein. The system 800 is similar to the system 500 described in connection with FIG. 5, except for the inclusion of several components to depict the data materialization and caching aspects in greater detail. Similar to the system 500 of FIG. 5, the system 100 includes a computing device 101 executing an application 102 that has stored data 105 in an object storage system 103. The object storage system 103 is configured to store units of data 105 as objects in a flat organization scheme with logical containers known as buckets 108.

The system 800 further includes a data analysis service 802, similar to the data analysis service 502. The data analysis service 802 is configured to process and analyze the data 105 stored in the object storage system 103. The data analysis service 802 includes the indexing component 504 configured to generate at least one main index 810 based on one or more data sources (e.g., the data 105), which are similar to the converted files 120 of FIG. 1. Aspects of the main index 810 may be similar to the index 510 of FIG. 5. In some aspects, the indexing component 504 may utilize the file converter 110 of FIG. 1 for processing one or more data sources with the object storage system 103 into the described converted file format. In some examples, the indexing component 504 may read the raw data from object storage, and create the main index 810, which may then be stored back in object storage. In some examples, queries are processed based on the indexes and raw data may not be read to resolve any particular query request. In other cases, the indexing component 504 reads the raw data from another source (e.g., not object storage), and stores the resulting indexes in object storage. Although the example of FIG. 8 illustrates a single instance of the indexing component 504, it is understood that the operations of the described techniques are able to be performed by a distributed system in parallel. For example, the system 800 may execute multiple instances of the indexing component 504 to convert a large amount of data in object storage 103 to the described converted format.

The main index 810 is an indexed form of the one or more data sources, which is similar to the index 510 of FIG. 5. In some aspects, the indexing component 504 may utilize the analysis component 112 of FIG. 1 for analyzing one or more data sources and generating statistical information (e.g., a manifest portion). In the illustrated example of FIG. 8, the main index 810 includes at least one manifest portion 826, one or more symbol portions 122, and one or more locality portions 124. The manifest portion 826 contains schema information, statistics, metrics, and other metadata related to the original data source(s), to the index, and to the indexing processing performed. The symbol portions 122 contain the symbols found in a data source file (e.g., ordered internally). The locality portions 124 contain values representing the respective locations of those symbols in the original data sources (i.e., raw/refined source). As described in connection with the example of FIG. 5, the combination of the manifest file, the symbol file, and the locality files may be used to optimize access to object storage, where each component file is used to resolve a materialization request with reduced time, size, and cost metrics (i.e., how long does it take to index a data source, of what size is the resulting index, and at what cost) compared to known techniques.

In one aspect, the manifest file(s) 826 may include statistics and metrics about the indexed data, which were compiled during the indexing process, and may be updated as a result of any refinement or transformation operations performed on the index. Such statistics provide enough information to either resolve a specific request and/or scope (i.e., reduce) object storage access, without accessing the underlying symbol files, locality files, or raw source data, or at least with reduced accesses compared to the known techniques.

In one aspect, the data analysis service 802 may provide a graphical user interface that displays the data sources stored in object storage and that provides an interface through which a user can analyze and run queries on the data sources. The graphical user interface of the data analysis service 802 may enable a user to access the data sources contained in a main index 810, rather than be limited to displaying the content of each of the individual physical buckets 108. After data source(s) have been indexed and published, the data analysis service 802 may use the indexes to display statistics related to the underlying data sources, as well as provide user interface elements for the submission of a search query to be executed on the data index.

In an aspect, the data analysis service 802 may create an initial main index 810 of object data having a schema and sort order corresponding to the lossless state of the original raw sources (i.e., data 105). In other words, the materialization of this index, which is akin to a relational database generalized selection (i.e., "SELECT *"), will reproduce the exact raw source state of data 105.

In another aspect, a main index 810 may be refined using one more transformation operations, which can be seen as a new index that can be analyzed and/or used as another index to be refined again. For example, a main index 810 may be transformed by a change in schema types (i.e., columns), a change in schema type names, a change in the order or shape of the schema, a change in the data set sort order by type, or an aggregation or correlation between two or more indexes. The transformed index may be implemented by a modification to the existing manifest or creation of a new manifest, while the linked-to symbol files and locality files remain unchanged. In an aspect, transformations may be considered as descriptions where each description can be applied in sequence to produce the desired data set. Each transformation operation may be executed on-demand. That is, a new manifest file that describes or specifies new transformations, aggregations, correlations, or sort orders, and any combination thereof can be executed on the symbol files and the locality files dynamically and in a desired sequence to produce a particular data set.

As shown in FIG. 8, the system 800 includes a search component 804 configured to receive one or more search queries 803 for the data stored in one or more main indexes 810. In some aspects, a search query may be one of a relational query and a text search. The search component 804 is configured to execute the search queries 803 on data using the main index 810, including an analysis of the manifest portions 826, the symbol portion(s) 122, and the locality portion(s) 124. The unique arrangement and structure of the data structures in the main index 810 advantageously enable the described system to quickly perform such operations on data stored in object storage compared to known techniques.

In an aspect, the search component 804 is configured to execute one or more search queries 803 for the analysis of data in a main index 810, including text search and relational queries. In one aspect, the search component 804 may be configured to scope the search query 803. For example, the search component 804 includes a scoping component 806 that is configured to select one or more segments of the main index 810 on which to execute. The scoping component 806 (sometimes referred to as a "query planner") may use the manifest files 826 to scope (i.e., reduce) the object storage access. For example, the scoping component 806 may use the manifest files 826 to determine where the data is, which then allows the search component 804 to efficiently fetch the particular symbol files 122 and/or locality files 124 that can answer the search query 803. For example, by parsing the metadata and statistics contained in the manifest file 826, the scoping component 806 may determine whether the one or more symbol files 122 and/or the one or more locality files 124 associated with the manifest file 826 can provide the answer to the search query 803. In an aspect, the scoping component 806 performs a "full" scope of the main index 810 to identify each of the relevant segments of the main index 810 (e.g., the one or more segments that can provide the answer to the search query 803).

The search component 804 may be further configured to execute the scope. For example, the search component 804 includes a scope execution component 808 that is configured to execute the full scope of the main index 810 to resolve the search query 803. The scope execution component 808 may use the symbol files 122 and the locality files 124 associated with the segments selected by the scoping component 806 to retrieve data from the source data (e.g., a result set 812). In an aspect, resolving the search query 803 may include generating a materialized view of the result set 812.

To facilitate efficiently improving query performance, the example data analysis service 802 includes a caching component 814. The caching component 814 is configured to improve query performance by reducing a "scope time" associated with performing a full scope of a subsequent search query. For example, the caching component 814 includes a flagging component 816 configured to generate a cached manifest file that associates the segments selected by the scoping component 806 to the search query 803. The flagging component 816 may store the cached manifest file in persistent memory. In some examples, a manifest file may comprise a state identifier to indicate a cached state of the respective manifest file. For example, the flagging component 816 may set the state identifier of a cached manifest file to a value indicating that the respective manifest file is a cached manifest file. As described in detail below, the cached manifest file may enable the data analysis service 802 to refrain from performing a full scope of a search query by enabling the scoping component 806 to select the segments associated with the cached manifest file as the scoped segments. For example, the scoping component 806 may first parse the state identifiers of the manifest files to find a subset of manifest files that correspond to cached manifest files. The scoping component 806 may then use the subset of manifest files (e.g., the manifest files corresponding to the cached manifest files) to select the segments when performing a scope of the search query.

The example caching component 814 may be further configured to improve query performance by reducing an "execution time" associated with executing the scope. For example, the caching component 814 includes a scope grouping component 818 configured to improve query performance by reducing the time associated with executing the scope. For example, the scope grouping component 818 may be configured to store the results of the search query 803 in a cache index 820. As described in detail below, the cache index 820 may store the results from previous search queries. Moreover, in some examples, the scope grouping component 818 may group subsets of the results into scope groups and generate a unique identifier for each of the scope groups. The scope grouping component 818 may store the unique identifier and the results associated with each scope group in the cache index 820.

Figure 9:
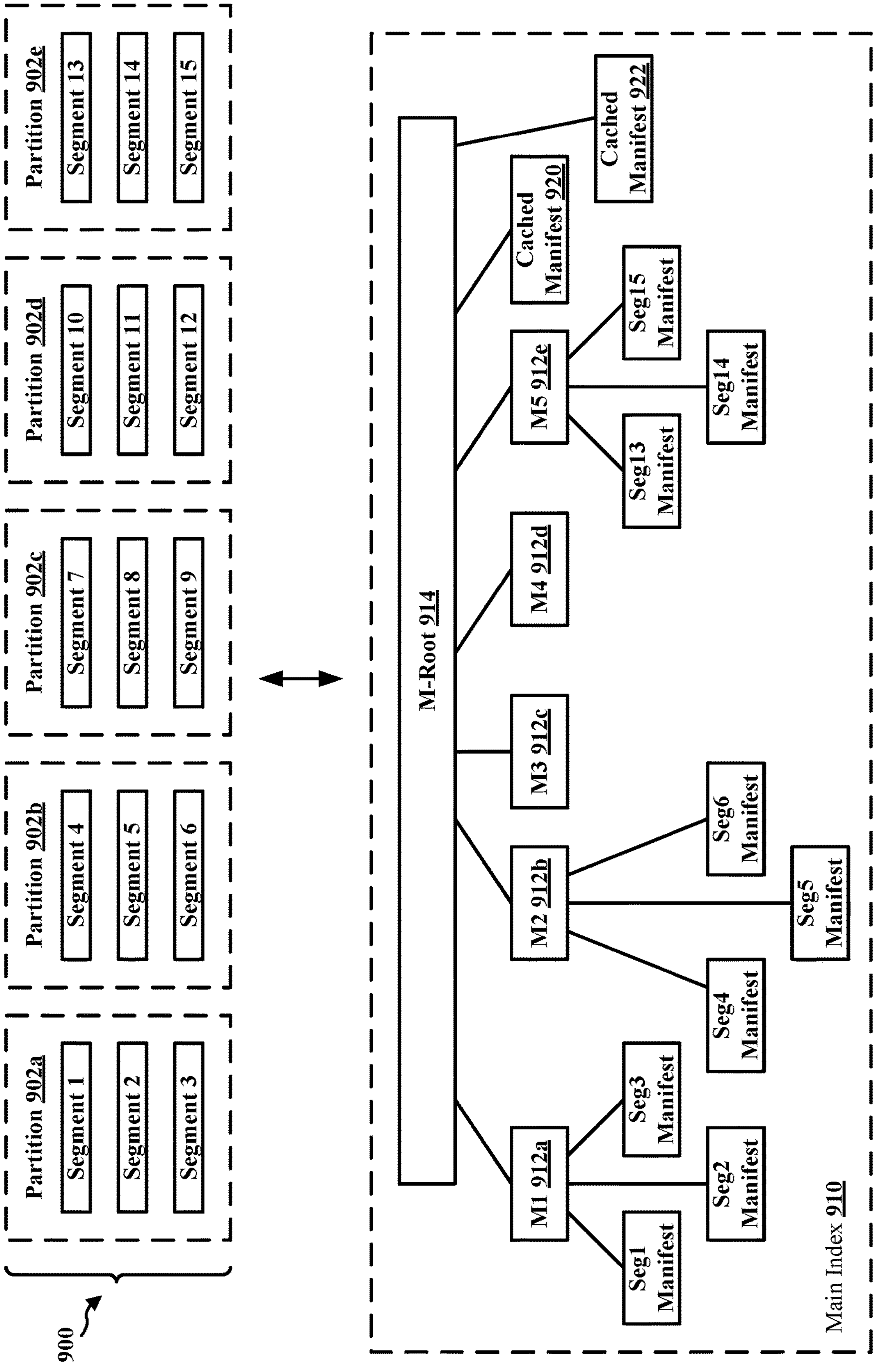
FIG. 9 depicts a plurality of segments of a dataset that may be associated with a main index, in accordance with various aspects of the present disclosure.

FIG. 9 depicts a plurality of segments 900 of a dataset that may be associated with a main index 910, as presented herein. For example, when the indexing component 504 generates the main index 910, the indexing component 504 may "chunk" one or more data sources of the dataset into the plurality of segments 900. The example of FIG. 9 includes fifteen example segments 900 for the sake of illustration, but it is understood that an index may include any suitable quantity of segments. For example, a large index (e.g. on the order of petabytes) may comprise thousands of segments (e.g., tens of thousands of segments, hundreds of thousands of segments, etc.). The indexing component 504 may logically group the segments 900 into partitions 902*a*-902*e*. For example, a first partition 902*a* may correspond to a logical grouping including segments 1 to 3, a second partition 902*b* may correspond to a logical grouping including segments 4 to 6, a third partition 902*c* may correspond to a logical grouping including segments 7 to 9, a fourth partition 902*d* may correspond to a logical grouping including segments 10 to 12, and a fifth partition 902*e* may correspond to a logical grouping including segments 13 to 15.

The indexing component 504 may also generate manifest files 912*a*-912*e* associated with each of the partitions 902*a*-902*e*. For example, the indexing component 504 may generate a first partition manifest file 912*a* ("M1") based on a statistical analysis of the segments 1 to 3 of the first partition 902*a*, may generate a second partition manifest file 912*b* ("M2") based on a statistical analysis of the segments 4 to 6 of the second partition 902*b*, may generate a third partition manifest file 912*c* ("M3") based on a statistical analysis of the segments 7 to 9 of the third partition 902*c*, may generate a fourth partition manifest file 912*d* ("M4") based on a statistical analysis of the segments 10 to 12 of the fourth partition 902*d*, and may generate a fifth partition manifest file 912*e* ("M5") based on a statistical analysis of the segments 13 to 15 of the fifth partition 902*e*.

Although not shown in the example of FIG. 9, it is to be understood that the main index 910 includes one or more symbol files, such as the example symbol file 122, and one or more locality files, such as the example locality file 124. Moreover, each of the manifest files 912*a*-912*e* may specify which of the one or more symbol files is associated with which of the one or more locality files.

As described above, the manifest files of an index can be arranged in a tree-like data structure for faster access and query execution. In the illustrated example of FIG. 9, the main index 910 includes a root manifest file 914 ("M-Root") that describes the topology of the dataset associated with the segments 900. Manifest files can be summarized and reference other "leaf" manifest files, which can represent an amount of raw data up to a threshold limit (e.g., 100 GB). For example, the root manifest file 914 references the partition manifest files 912*a*-912*e* corresponding to the respective partitions 902*a*-902*e*. Each of the partition manifest files 912*a*-912*e* references one or more segment manifest files corresponding to a respect one of the segments 900. For example, the first partition manifest file 912*a* references a first segment manifest file corresponding to the segment 1 ("seg1 manifest"), a second segment manifest file corresponding to the segment 2 ("seg2 manifest"), and a third segment manifest file corresponding to the segment 3 ("seg3 manifest"). In a similar manner, the second partition manifest file 912*b*, the third partition manifest file 912*c*, the fourth partition manifest file 912*d*, and the fifth partition manifest file 912*e* reference respective segment manifest files. Additionally, one or more of the segment manifest files may reference one or more sub-segment manifest files, for example, that may be associated with a subset of data sources of the respective segment.

The manifest files are configured to scope requests to resolve a particular search and/or query. In other words, the manifest files may be used to determine whether a particular symbol and locality file pair does not have information related to a specific request. The use of such manifest files greatly reduces the number of object storage system access requests that the data analysis service 802 uses to materialize a result. For example, a first symbol may be only found in a data source associated with the segment 14. The search component 804 may parse the root manifest file 914 and determine that the first to fourth partition manifest files 912*a*-912*d* do not have information related to the first symbol. The search component 804 may then refrain from or otherwise exclude performing object storage accesses with respect to the respective segments 1 to 12 associated with the first to fourth partition manifest files 912*a*-912*d*. In a similar manner, the search component 804 may parse the fifth partition manifest file 912*e* and determine that the segments 13 and 15 do not have information related to the first symbol and, thus, may refrain from or otherwise exclude performing object storage accesses with respect to the respective segments 13 and 15.

As described above, the example data analysis service 802 may facilitate improving query performance. For example, for each search query 803, the scoping component 806 performs a full scope to identity each of the segments 900 of the dataset that have information related to the search query 803.

As described above, in some instances, the scoping of work (e.g., the performing of the full scope by the scoping component 806) may take seconds to perform. To facilitate reducing the scope time associated with performing a full scope, the example caching component 814 includes the flagging component 816 configured to generate a cached manifest file that associates the segments selected by the scoping component 806 to the search query 803. For example, the scoping component 806 may identify one or more segments of the main index 910 when performing the full scope of the main index 910.

The flagging component 816 may group the one or more identified segments into a "branch" that corresponds to a slice of the main index 910.

The flagging component 816 may also generate a cached manifest file that summarize s the one or more identified segments. For example, the flagging component 816 may generate a cached manifest file 920 by analyzing the manifest files associated with the one or more identified segments and generating statistical information based on the data contained in the manifest files. The flagging component 816 may also modify the root manifest file 914 associated with the main index 910 to include the cached manifest file 920. In some examples, the manifest files of the main index 910 may include a state identifier to indicate a cached state of the respective manifest file. In some examples, the state identifier may be represented in a binary format (e.g., as a "0" or a "1"). For example, when the indexing component 504 generates the manifest file 826, the indexing component 504 may set the state identifier of the manifest file to a first value (e.g., as a "0") to indicate that the respective manifest file 826 is not a cached manifest file. When the flagging component 816 generates the cached manifest file 920, the flagging component 816 may set the state identifier of the manifest file to a second value (e.g., as a "1") to indicate that the respective cached manifest file 920 is a cached manifest file. However, it may be appreciated that other examples may employ additional or alternate techniques for representing the state identifier and indicating the cached state of a respective manifest file. The adding of the cached manifest file 920 to the root manifest file 914 may enable the data analysis service 802 to reduce the time associated with scoping a subsequent search query. For example, if a subsequent search query fits within the metrics of the cached manifest file 920, the performing of the full scope by the scoping component 806 may be replaced by selecting the one or more segments corresponding to the cached manifest file. That is, aspects disclosed herein may leverage the indexing format described herein to efficiently reduce the scope time associated with scoping a search query.

As an example, for a first search query, the scoping component 806 may perform a full scope of the main index 910 by parsing the manifests of the main index 910 and identify the segments 1 to 5 include data for resolving the first search query based on the metrics associated with at least the first partition manifest file 912*a* and the second partition manifest file 912*b*. The flagging component 816 may group the segments 1 to 5 into a flagged branch associated with the first search query. The flagging component 816 may also generate the cached manifest file 920 that summarizes the segments 1 to 5 associated with the first search query. At a later time, the data analysis service 802 may receive a second search query, and the segments 2 to 4 may fully resolve the second search query. When scoping the second search query, the scoping component 806 may first determine if a flagged branch fully or partially matches the second search query. In the above example, the flagged branch and the corresponding cached manifest file 920 correspond to the segments 1 to 5. Accordingly, the scoping component 806 may determine that the flagged branch fully matches the second search query. Thus, instead of performing a full scope of the main index 910 to determine the scoped segments associated with the second search query, the scoping component 806 may use the one or more segments associated with the flagged branch as the scoped segments.

In another example, the data analysis service 802 may receive a third search query that maps to the segments 6 to 10 of the dataset. When scoping the third search query, the scoping component 806 may first determine if a flagged branch fully or partially matches the third search query. In this example, the flagged branch and the corresponding cached manifest file 920 correspond to the segments 1 to 5. Accordingly, the scoping component 806 may determine that the flagged branch does not match the third search query. In such examples, the scoping component 806 may perform a full scope of the main index 910 to determine the scoped segments associated with the third search query. The scoping component 806 may also create a second flagged branch and a second cached manifest file 922 that corresponds to the segments 6 to 10.

In yet another example, the data analysis service 802 may receive a fourth search query that maps to the segments 6 to 12 of the dataset. When scoping the fourth search query, the scoping component 806 may first determine if a flagged branch fully or partially matches the fourth search query. In this example, the flagged branch and the corresponding cached manifest file 920 correspond to the segments 1 to 5 and the second flagged branch and the corresponding second cached manifest file 922 correspond to the segments 6 to 10. Accordingly, the scoping component 806 may determine that the second flagged branch partially matches the fourth search query. Thus, instead of performing a full scope of the main index 910 to determine the scoped segments associated with the fourth search query, the scoping component 806 may use the one or more segments associated with the second flagged branch as a portion of the scoped segments. The scoping component 806 may then perform a full scope of the main index 910 for the remaining portions of the fourth search query. That is, the scoping component 806 may use the second flagged branch to identify the segments 6 to 10 and then perform a full scope of the main index 910 to identify the segments 11 and 12.

While the generating of the cached manifest file may improve the scope time associated with scoping a search query, it may be appreciated that the goal of resolving the search query is the generating of a result set that answers the search query. Referring again to the example of FIG. 8, the caching component 814 includes the scope grouping component 818 to facilitate improving the generating of the result set. The scope grouping component 818 may be configured to store the results of the search query 803 in the cache index 820. The cache index 820 may be a secondary index that the data analysis service 802 maintains in parallel to the main index 810. Although the illustrated example of FIG. 8 indicates that the cache index 820 and the main index 810 are stored in a same bucket 108 of object storage, in other examples, the cache index 820 may be stored in a different bucket than the main index 810. It may be appreciated that in some examples, the bucket 108 may represent a grouping of any source data objects. In some examples, the source data objects may correspond to a subset of objects within a bucket. In some examples, the source data objects may correspond to a set of objects across buckets. Thus, a bucket, which is a group, may act as a lens into object storage. In some aspects, the bucket may be seen as an entry point into cloud object storage. Additionally, an index (e.g., the main index 810 and/or the cache index 820) represents an object group where the group of objects are a sequence of symbol files 122, locality files 124, and manifest files 826.

In some examples, similar to the main index 810, the cache index 820 may be configured as a distributed index. In some such examples, portions of the main index 810 and the cache index 820 may be stored in a same bucket of object storage while other portions of the main index 810 and the cache index 820 may be stored in different buckets of object storage. Thus, when a subsequent search query resolves to the same result set as a previously resolved search query, the data analysis service 802 may efficiently provide the result set for the subsequent search query by retrieving the data from the cache index 820.

However, it may be appreciated that while a subsequent search query producing the same result set as a previously resolved search query may occur, it is more likely that a subsequent search query may overlap with a portion of the result set generated for the previously resolved search query. To improve the likelihood of occurrences of "hits" for the data stored in the cache index 820, the scope grouping component 818 may be further configured to generate scoped groups by grouping subsets of the segments selected by the scoping component 806. The scope grouping component 818 may associate each scoped group with a respective identifier (e.g., a universally unique identifier (UUID)). The scoped group identifier may uniquely identify the segments of the scoped group. When the scope execution component 808 is executing a scope, the scope execution component 808 may check the scoped group identifiers in the cache index 820 to determine if at least a portion of the data associated with the scope may be retrieved from the cache index 820. That is, the scoped group identifiers may enable the scope execution component 808 to retrieve at least a portion of data associated with executing a scope from the cache index 820 instead of performing object storage accesses to retrieve the data from object storage.

FIG. 10 depicts an example cache index 1000, as presented herein. The example cache index 1000 includes six example rows 1002*a*-1002*f* that each correspond to a result. The contents of the cache index 1000 may be populated based on the executing of a full scope. To improve the likelihood of a hit with respect to the results in the cache index 1000, the scope grouping component 818 may group the results. For example, the scope grouping component 818 may group the results of the first two rows (e.g., a first row 1002*a* and a second row 1002*b*) as a first scoped group, may group the results of the second two rows (e.g., a third row 1002*c* and a fourth row 1002*d*) as a second scoped group, and may group the results of the last two rows (e.g. a fifth row 1002*e* and a sixth row 1002*f*) as a third scoped group. The scope grouping component 818 may also generate a UUID associated with each of the scoped groups. The UUID may be a hash created based on a hash algorithm applied to the results of the respective scoped group. In the illustrated example of FIG. 10, the UUID for the first scoped group is "Scope #1", the UUID for the second scoped group is "Scope #2", and the UUID for the third scoped group is "Scope #3".

When the scope execution component 808 starts to execute a scope, the scope execution component 808 may first perform a results cache "hit check" to determine if the results of the scope are already stored in the cache index. For example, a scope may map to the second scoped group (Scope #2). In such examples, the scope execution component 808 may retrieve the results associated with the third row 1002*c* and the fourth row 1002*d* from the cache index 1000 instead of, for example, retrieving the results from object storage, as described above in connection with step 710 of FIG. 7.

In some examples, the scope execution component 808 may determine that the results stored in the cache index 1000 may partially match the scoped segments for execution. In such examples, the scope execution component 808 may obtain the partial results from the cache index 1000 and perform a full scope of the remaining scoped segments to obtain the remaining results.

Although the illustrated scoped groups of FIG. 10 include grouping results from two different rows, it may be appreciated that other examples may associate any suitable quantity of results with each scoped group. For example, a group size may correspond to 20 or 25 results.

FIG. 11 depicts a listing 1100 of pseudocode for scope grouping, as presented herein.

The example listing 1100 includes a first portion 1110 that corresponds to the grouping of scopes. For example, the first portion 1110 describes an example of generating random identifiers (IDs) to test. The first portion 1110 also describes using a Modulo operator to create the ID groupings. In the illustrated example, the Modulo operator ("modder") is set to a value of 3. After the ID groupings are created, the first portion 1110 also describes grouping the scopes based on the ID groupings. The example listing 1100 includes a second portion 1120 that corresponds to the generating of identifiers associated with the scoped groups. For example, the second portion 1120 describes generating a UUID based on a scope grouping. The second portion 1120 also describes storing the generated UUID in the cache index as an identifier for the respective scoped group. The example listing 1100 also includes a third portion 1130 that corresponds to finding a scoped group in a cache index. For example, the third portion 1130 describes generating a UUID based on a scope grouping. The third portion 1130 also describes using the generated UUID as a look-up for the identifiers in the cache index for the respective scoped groups.

Thus, it may be appreciated that the techniques disclosed herein facilitate the efficient scaling of caching on object storage, while also achieving the reduced cost and complexity associated with durable storage. That is, disclosed techniques provide increasing query performance, such as sub-second query responses, that can be scaled in the context of database requirements, such as big data scenarios (e.g., terabyte (TB) or petabyte (PB) datasets). Once data is indexed, the disclosed techniques provide the ability to quickly and easily assemble (or resolve) search queries in a dynamic manner and at scale. Moreover, the disclosed techniques leverage the framework of the indexed data format to partially or fully "match" queries to past query results. Additionally, in contrast to block-level caching that may be used in storage layers, the disclosed caching techniques increase performance of database results.

Figure 12:
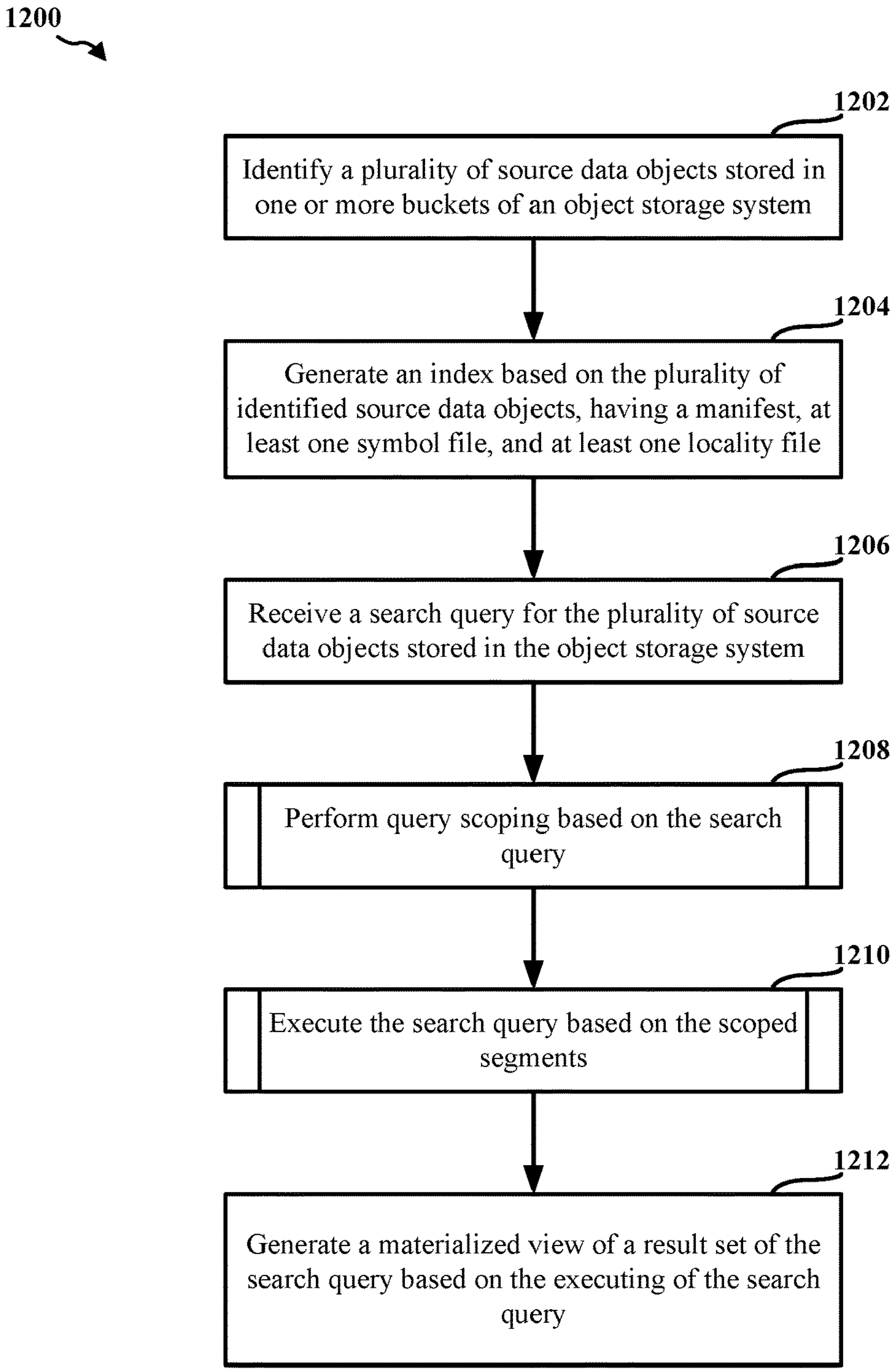
FIG. 12 is a flowchart illustrating a method for searching and querying data in object storage, in accordance with various aspects of the present disclosure.

FIG. 12 is a flowchart illustrating a method 1200 for searching and querying data in object storage, as presented herein. The method 1200 may be performed by the data analysis service 802, by a sub-component of the data analysis service 802, such as the indexing component 504, the search component 804, the scoping component 806, the scope execution component 808, the caching component 814, the flagging component 816, the scope grouping component 818, or by the object storage system 103. It is noted that the following description of the example method 1200 refers to the example system 800 and components described above in connection with FIG. 8. The method 1200 enables text search and analytics queries to be performed on object storage without the expense and additional storage costs of prior approaches, such as data warehousing and ETL processes.

The method 1200 begins at step 1202, in which a plurality of source data objects stored in one or more buckets of an object storage system is identified. In some aspects, the identified plurality of source data objects is determined based on a grouping specifying a criteria for inclusion in the index. For example, the main index 910 may be based on data objects associated with a data type of CSV files. In some aspects, the source data objects are identified by user input that selects an object grouping of source data objects contained within a bucket or across buckets. In some aspects, the object grouping may be referred to as a "virtual bucket" representing a selected or filtered grouping of source data objects contained within a physical bucket or across different physical buckets. In some use cases, the user may select the bucket for discovery, analysis, and/or indexing. In other aspects, the source data objects are automatically triggered in response to detecting the creation or modification of the data objects in object storage.

At step 1204, the indexing component may generate an index based on the plurality of identified source data objects. In an aspect, the index includes a manifest, at least one symbol file, and at least one locality file, as described in connection with the at least one manifest file 826, the one or more symbol files 122, and the one or more locality 124 of FIG. 8. The manifest may specify a mapping of the at least one symbol file to the corresponding at least one locality file. In some aspects, the manifest may include a tree-like data structure of leaf manifest files having a root manifest file that summarizes at least one of the leaf manifest files, as described in connection with the root manifest file 914 of FIG. 9. In an aspect, the symbol file is associated with a first data object of the plurality of source data objects and comprises a sorted unique set of the symbols from the first data object. In some such examples, each of the symbols may be stored at a corresponding location within the symbol file. The locality file that is mapped to the symbol file includes a plurality of location values referencing the corresponding symbol file. A location value at a respective position within the locality file may represent an occurrence in the first data object of a corresponding symbol identified by the respective location value.

At step 1206, the data analysis service may receive a search query for the plurality of source data objects stored in the object storage system. For example, the data analysis service 802 may receive the search query 803. In some aspects, the search query may be one of a relational query and a text search.

At step 1208, the data analysis service performs query scoping based on the search query. For example, the scoping component 806 may perform the query scoping to reduce object storage access. In some examples, the scoping component 806 may parse the manifest files of the index to resolve the search query. For example, when determining if a symbol is within a symbol and locality file pair via a text search or range within a relational query, the manifest 622 can quickly scope such requests.

In some aspects, the query scoping is performed to select the one or more segments on which the data analysis service 802 executes to obtain a result set. Example techniques for implementing the performing of the query scoping are described in connection with the methods of FIGS. 13, 14, and 15.

At step 1210, the data analysis service executes the search query based on the scoped segments. For example, for each selected segment, the scope execution component 808 may perform a search to fetch the particular symbol files and/or locality files that can answer (or resolve) the search query. In some examples, the results of executing the search query for each selected segment may be aggregated to form a result set that answers (or resolves) the search query. In some aspects, the data analysis service 802 may query the generated index in a sequence order comprised of the manifest, the at least one symbol file, and the at least one locality file. In some aspects, the data analysis service 802 may use the locality file and the symbol file to return a result set based on the location of the symbols in the data source file. Example techniques for implementing the executing of the search query based on the scoped segments are described in connection with the methods of FIGS. 16 and 17.

At step 1212, the data analysis service generates a materialized view of the result set of the search query based on the executing of the search query. In some examples, the data analysis service 802 may generate the result set based on the manifest, the at least one symbol file, and the at least one locality file of the generated index. In an aspect, the materialized view may be a matrix of columns and rows of data representing an ordered/reduced dataset of one or more converted file matrices of columns and rows.

Figure 13:
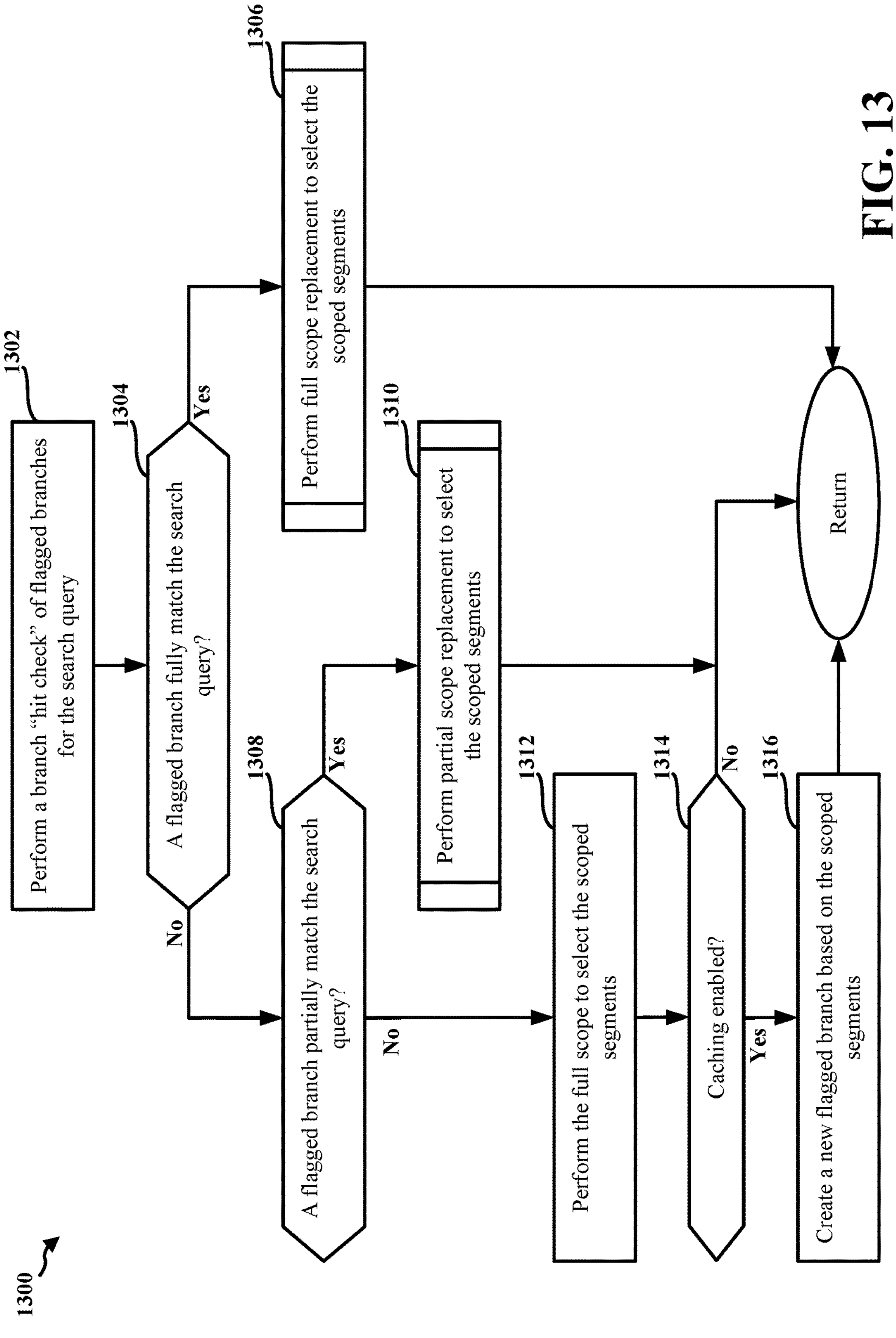
FIG. 13 is a flowchart illustrating a method of performing query scoping to select one or more segments, in accordance with various aspects of the present disclosure.
Figure 14:
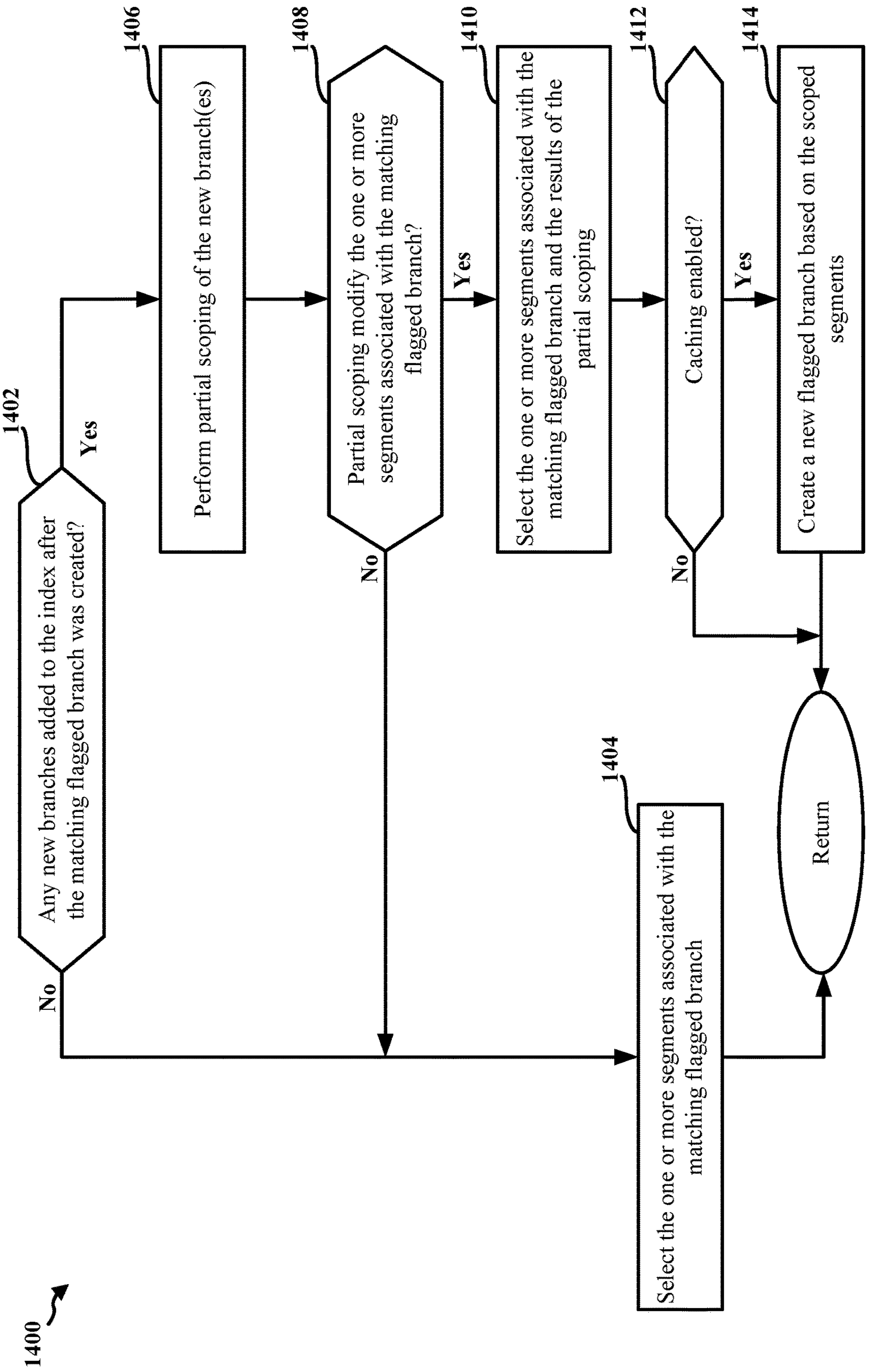
FIG. 14 is a flowchart illustrating a method of performing full scope replacement to select the scoped segments, in accordance with various aspects of the present disclosure.
Figure 15:
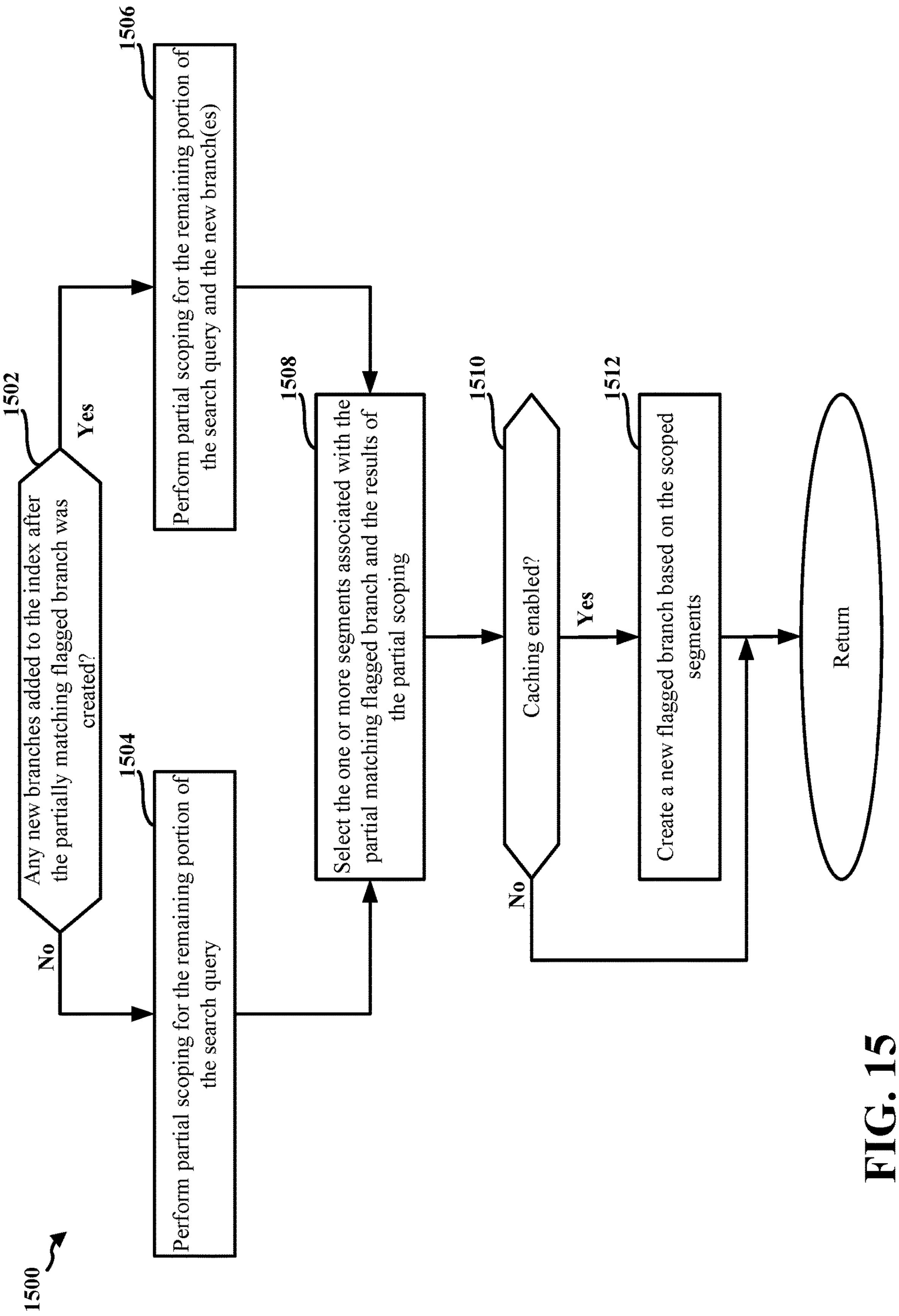
FIG. 15 is a flowchart illustrating a method of performing partial scope replacement to select the scoped segments, in accordance with various aspects of the present disclosure.

FIGS. 13, 14, and 15 are flowcharts illustrating methods of performing query scoping based on the search query, as presented herein. The methods of FIGS. 13, 14, and 15 may be performed by the data analysis service 802, by a subcomponent of the data analysis service 802, such as the indexing component 504, the search component 804, the scoping component 806, the scope execution component 808, the caching component 814, the flagging component 816, the scope grouping component 818, or by the object storage system 103. It is noted that the following description of the example methods of FIGS. 13, 14, and 15 refer to the example system 800 and components described above in connection with FIG. 8.

FIG. 13 is a flowchart illustrating a method 1300 of performing query scoping to select one or more segments, as presented herein. The method 1300 may be performed to implement step 1208 of FIG. 12.

At step 1302, the data analysis service performs a branch "hit check" of flagged branches for the search query. For example, the scoping component 806 may parse the one or more cached manifest files 920 of the root manifest file 914 of the main index 910 to determine if a flagged branch fully matches the search query. That is, if the search query fits within the metrics of a cached manifest file 920, the scoping component 806 may determine that the flagged branch corresponding to the cached manifest file 920 fully matches the search query.

If, at step 1304, the data analysis service determines that a flagged branch fully matches the search query, then, at step 1306, the data analysis service performs a full scope replacement to select the scoped segments. For example, the flagged branch may represent a full scope and the scoping component 806 may leverage the one or more segments associated with the matching flagged branch instead of performing the full scope to select the one or more segments (e.g., as described in connection with step 708 of FIG. 7). Aspects of implementing the performing of the full scope replacement are described in connection with a method 1400 of FIG. 14. Control may then return to step 1210 of FIG. 12 to execute the search query based on the scoped segments.

If, at step 1304, the data analysis service determines that no flagged branches fully match the search query, then, at step 1308, the data analysis service may determine if a flagged branch partially matches the search query. That is, if a portion of the search query fits within the metrics of a cached manifest file 920, the scoping component 806 may determine that the flagged branch corresponding to the cached manifest file 920 partially matches the search query. For example, the search query may request source data objects that include the term "green cars." A previous search query for the term "cars" may have resulted in the data analysis service creating a cached manifest file corresponding to the one or more segments that include the term "cars." The scoping component 806 may determine that the flagged branch corresponding to the cached manifest file partially matches the search term.

If, at step 1308, the data analysis service determines that a flagged branch partially matches the search query, then, at step 1310, the data analysis service performs a partial scope replacement to select the scoped segments. For example, the scoping component 806 may leverage the one or more segments associated with the matching flagged branch to resolve at least a portion of the search query (e.g., results that include the term "cars" in the above example). Aspects of implementing the performing of the partial scope replacement are described in connection with a method 1500 of FIG. 15. Control may then return to step 1210 of FIG. 12 to execute the search query based on the scoped segments.

If, at step 1308, the data analysis service determines that no flagged branches partially match the search query, then, at step 1312, the data analysis service performs a full scope to select the scoped segments. Aspects of performing a full scope are described above in connection with step 708 of FIG. 7. Performing the full scope may be costlier (e.g., take more time to perform) than performing the full scope replacement (e.g., at step 1306) or performing the partial scope replacement (e.g., at step 1310).

At step 1314, the data analysis service may determine if caching is enabled. For example, if, at step 1314, the data analysis service determines that caching is not enabled, then control may return to step 1210 of FIG. 12 to execute the search query based on the scoped segments.

Otherwise, if, at step 1314, the data analysis service determines that caching is enabled, then, at step 1316, the data analysis service may create a new flagged branch based on the scoped segments. For example, the flagging component 816 may create a new cached manifest file (e.g., the cached manifest file 920) that associates the one or more segments selected by the scoping component 806 (e.g., the new flagged branch) to the search query. The flagging component 816 may also store the new cached manifest file in the root manifest file 914 of the main index 910. Thus, the new cached manifest file may facilitate improving query performance by enabling the data analysis service to leverage the one or more segments associated with the corresponding new flagged branch when resolving a subsequent search query.

FIG. 14 is a flowchart illustrating a method 1400 of performing full scope replacement to select the scoped segments, as presented herein. The method 1400 may be performed to implement step 1306 of FIG. 13.

At step 1402, the data analysis service determines if any new branches were added to the index after the matching flagged branch was created. For example, the matching flagged branch represents the one or more segments that were part of the main index 910 when a previous search query was resolved. However, it may be appreciated that after the matching flagged branch was created and the corresponding new cached manifest file was added to the root manifest file, one or more new branches may be added to the main index 910. For example, the indexing component 504 may index additional data source objects and create new branches in the manifests of the main index 910 to reflect the indexing of the additional data source objects.

If, at step 1402, the data analysis service determines that no new branches were added to the index after the matching flagged branch was created, then, at step 1404, the data analysis service selects the one or more segments associated with the matching flagged branch as the scoped segments. In this manner, the data analysis service may improve query performance by leveraging the scoped segments of a previously resolved search query to use when executing the search query instead of performing a full scope to identify the one or more segments that may include data related to the search query. Control may then return to step 1210 of FIG. 12 to execute the search query based on the scoped segments.

If, at step 1402, the data analysis service determines that a new branch was added to the index after the matching flagged branch was created, then, at step 1406, the data analysis service performs a partial scoping of the new branch(es). For example, the scoping component 806 may identify the new branches and based on the respective manifest files, may determine which (if any) of the new branches include data related to the search query.

At step 1408, the data analysis service determines if the partial scoping modified the one or more segments associated with the matching flagged branch. For example, the scoping component 806 may determine whether performing the partial scoping identified one or more additional segments that are not associated with the matching flagged branch.

If, at step 1408, the data analysis service determines that the partial scoping did not modify the one or more segments associated with the matching flagged branch, then control proceeds to step 1404 to select the one or more segments associated with the matching flagged branch as the scoped segments.

Otherwise, if, at step 1408, the data analysis service determines that the partial scoping does modify the one or more segments associated with the matching flagged branch, then, at step 1410, the data analysis service selects the one or more segments associated with the matching flagged branch and the results of the partial scoping as the scoped segments. For example, the scoping component 806 may include the one or more additional segments identified via the partial scoping to the one or more segments associated with the matching flagged branch.

At step 1412, the data analysis service may determine if caching is enabled. For example, if, at step 1412, the data analysis service determines that caching is not enabled, then control may return to step 1210 of FIG. 12 to execute the search query based on the scoped segments.

Otherwise, if, at step 1412, the data analysis service determines that caching is enabled, then, at step 1414, the data analysis service may create a new flagged branch based on the scoped segments. For example, the flagging component 816 may create a new cached manifest file (e.g., the cached manifest file 920) that associates the one or more segments selected by the scoping component 806 (e.g., the new flagged branch) to the search query. The flagging component 816 may also store the new cached manifest file in the root manifest file 914 of the main index 910. Thus, the new cached manifest file may facilitate improving query performance by enabling the data analysis service to leverage the one or more segments associated with the corresponding new flagged branch when resolving a subsequent search query.

In some examples, the new flagged branch may represent the one or more segments identified when performing the partial scoping of the new branch(es) (e.g., at step 1406). In some examples, the new flagged branch may represent the one or more segments associated with the matching flagged branch and the one or more additional segments identified when performing the partial scoping of the new branch(es).

FIG. 15 is a flowchart illustrating a method 1500 of performing partial scope replacement to select the scoped segments, as presented herein. The method 1500 may be performed to implement step 1310 of FIG. 13.

At step 1502, the data analysis service determines if any new branches were added to the index after the partially matching flagged branch was created. For example, the partially matching flagged branch represents the one or more segments that were part of the main index 910 when a previous search query was resolved. However, it may be appreciated that after the partially matching flagged branch was created and the corresponding new cached manifest file was added to the root manifest file, one or more new branches may be added to the main index 910. For example, the indexing component 504 may index additional data source objects and create new branches in the manifests of the main index 910 to reflect the indexing of the additional data source objects.

If, at step 1502, the data analysis service determines that no new branches were added to the index after the partially matching flagged branch was created, then, at step 1504, the data analysis service performs partial scoping for the remaining portion of the search query. For example, in the above example in which a search query includes the term "green cars" and the partially matching flagged branch identifies the one or more segments that resolve the previous search query "cars", the scoping component 806 may perform the partial scoping of the main index to identify the one or more segments that may include data related to the term "green." Control may then proceed to step 1508 to select the one or more segments associated with the partially matching flagged branch and the results of the partial scoping (e.g., the one or more segments associated with the remaining portion of the search query) as the scoped segments.

If, at step 1502, the data analysis service determines that one or more new branches were added to the index after the partially matching flagged branch was created, then, at step 1506, the data analysis service performs partial scoping for the remaining portion of the search query and the new branch(es). Control may then proceed to step 1508 to select the one or more segments associated with the partially matching flagged branch and the results of the partial scoping (e.g., the one or more segments associated with the remaining portion of the search query and the one or more segments (if any) associated with the new branch(es) of the main index 910) as the scoped segments.

At step 1508, the data analysis service selects the one or more segments associated with the partial matching flagged branch and the results of the partial scoping as the scoped segments. The results of the partial scoping may include one or more segments associated with performing a partial scoping for the remaining portion of the search query (e.g., as described in connection with step 1504). In other examples, the results of the partial scoping may include one or more segments associated with performing partial scoping of the remaining portion of the search query and the new branch(es) (e.g., as described in connection with step 1506).

At step 1510, the data analysis service may determine if caching is enabled. For example, if, at step 1510, the data analysis service determines that caching is not enabled, then control may return to step 1210 of FIG. 12 to execute the search query based on the scoped segments.

Otherwise, if, at step 1510, the data analysis service determines that caching is enabled, then, at step 1512, the data analysis service may create a new flagged branch based on the scoped segments. For example, the flagging component 816 may create a new cached manifest file (e.g., the cached manifest file 920) that associates the one or more segments selected by the scoping component 806 (e.g., the new flagged branch) to the search query. The flagging component 816 may also store the new cached manifest file in the root manifest file 914 of the main index 910. Thus, the new cached manifest file may facilitate improving query performance by enabling the data analysis service to leverage the one or more segments associated with the corresponding new flagged branch when resolving a subsequent search query.

In some examples, the new flagged branch may represent the one or more segments identified when performing the partial scoping for the remaining portion of the search query (e.g., at step 1504). In some examples, the new flagged branch may represent the one or more segments associated with the partially matching flagged branch and the one or more additional segments identified when performing the partial scoping for the remaining portion of the search query. In some examples, the new flagged branch may represent the one or more segments identified when performing the partial scoping for the remaining portion of the search query and the new branch(es) (e.g., at step 1506). In some examples, the new flagged branch may represent the one or more segments associated with the partially matching flagged branch and the one or more additional segments identified when performing the partial scoping for the remaining portion of the search query and the new branch(es). Control may then return to step 1210 of FIG. 12 to execute the search query based on the scoped segments.

Figure 16:
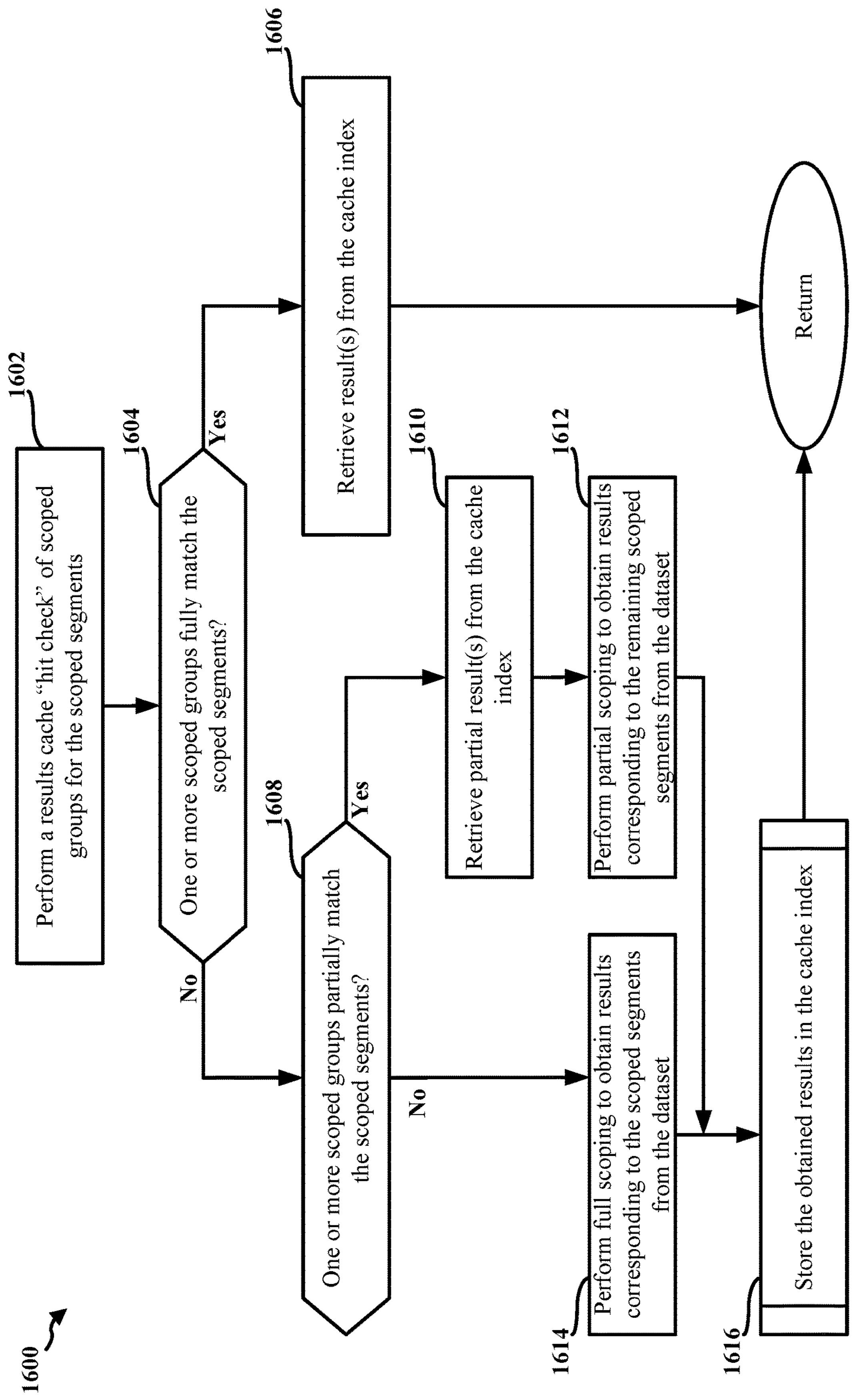
FIG. 16 is a flowchart illustrating a method of executing a search query based on the scoped segments, in accordance with various aspects of the present disclosure.
Figure 17:
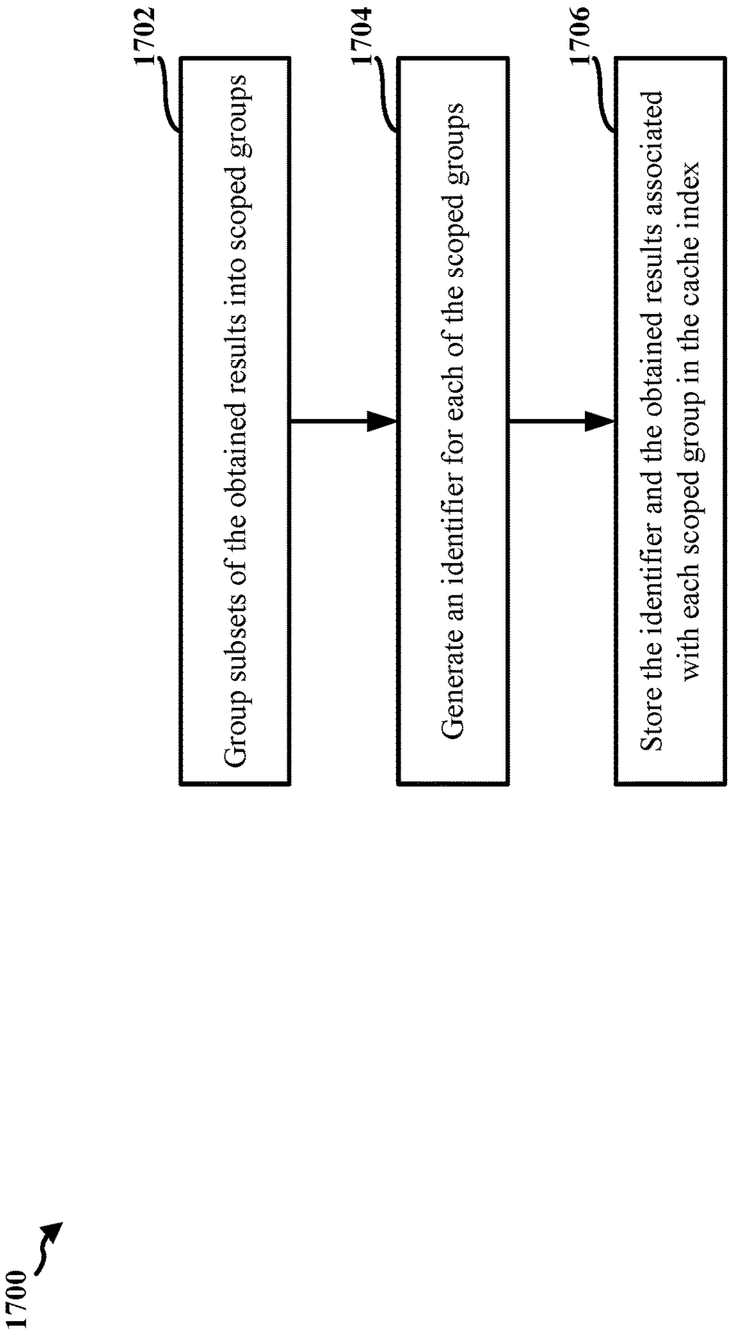
FIG. 17 is a flowchart illustrating a method of storing the obtained results in the cache index, in accordance with various aspects of the present disclosure.

FIGS. 16 and 17 are flowcharts illustrating methods for implementing the executing of the search query based on the scoped segments, as presented herein.

The methods of FIGS. 16 and 17 may be performed by the data analysis service 802, by a sub-component of the data analysis service 802, such as the indexing component 504, the search component 804, the scoping component 806, the scope execution component 808, the caching component 814, the flagging component 816, the scope grouping component 818, or by the object storage system 103. It is noted that the following description of the example methods of FIGS. 16 and 17 refer to the example system 800 and components described above in connection with FIG. 8.

FIG. 16 is a flowchart illustrating a method 1600 of executing a search query based on the scoped segments, as presented herein. The method 1600 may be performed to implement step 1210 of FIG. 12. The scoped segments may be determined based on the step 1208 of FIG. 12.

At step 1602, the data analysis service performs a results cache "hit check" of scoped groups for the scoped segments. For example, the scope execution component 808 may apply the third portion 1130 of the listing 1100 of FIG. 11 to determine if the scoped segments match the scoped groups stored in the cache index 820. In some examples, the scope execution component 808 may generate an identifier associated with the scoped segments and compare the scoped segments identifier with the UUIDs of the cache index to determine if a "hit check" occurs. That is, if the scoped segments identifier matches a QUID of the cache index, the scope execution component 808 may use the results from the cache index instead of performing a full scope of the dataset, as described above in connection with step 710 of FIG. 7.

If, at step 1604, the data analysis service determines that one or more scoped groups fully match the scoped segments, then, at step 1606, the scope execution component 808 retrieves the result(s) associated with the scoped segments from the cache index. Control may then return to step 1212 of FIG. 12 to generate a materialized view of the result set of the search query based on the executing of the search query.

If, at step 1604, the data analysis service determines that none of the scoped groups fully match the scoped segments, then, at step 1608, the data analysis service may determine if one or more scoped groups of the cache index partially match the scoped segments. If, at step 1608, the data analysis service determines that one or more scoped groups partially match the scoped segments, then, at step 1610, the scope execution component 808 retrieves the partial result(s) from the cache index. At step 1612, the data analysis service performs a partial scoping to obtain results corresponding to the remaining scoped segments from the dataset. For example, the scope execution component 808 may perform a scoping to obtain the results associated with the remaining scoped segment from the dataset. Control may then proceed to step 1616 to store the obtained results in the cache index.

If, at step 1608, the data analysis service determines that none of the scoped groups partially match the scoped segments, then, at step 1614, the data analysis service performs a full scoping to obtain results corresponding to the scoped segments from the data. For example, the scope execution component 808 may perform a scoping to obtain the results associated with the scoped segments from the dataset. Control may then proceed to step 1616 to store the obtained results in the cache index.

At step 1616, the data analysis service stores the obtained data in the cache index. For example, the scope grouping component 818 may store the results obtained from the dataset in the cache index 820. Techniques for implementing the storing of the obtained data in the cache index are described in connection with the example flowchart of FIG. 17.

FIG. 17 is a flowchart illustrating a method 1700 of storing the obtained results in the cache index, as presented herein. The method 1700 may be performed to implement step 1616 of FIG. 16. At step 1702, the data analysis service groups subsets of the obtained results into scoped groups. For example, the scope grouping component 818 may apply the first portion 1110 of the listing 1100 of FIG. 11 to group the obtained results. At step 1704, the data analysis service generates an identifier for each of the scoped groups. For example, the scope grouping component 818 may apply the second portion 1120 of the listing 1100 of FIG. 11 to generate the identifiers for each of the scoped groups. At step 1706, the data analysis service stores the identifier and the obtained results associated with each scoped group in the cache index.

Figure 18:
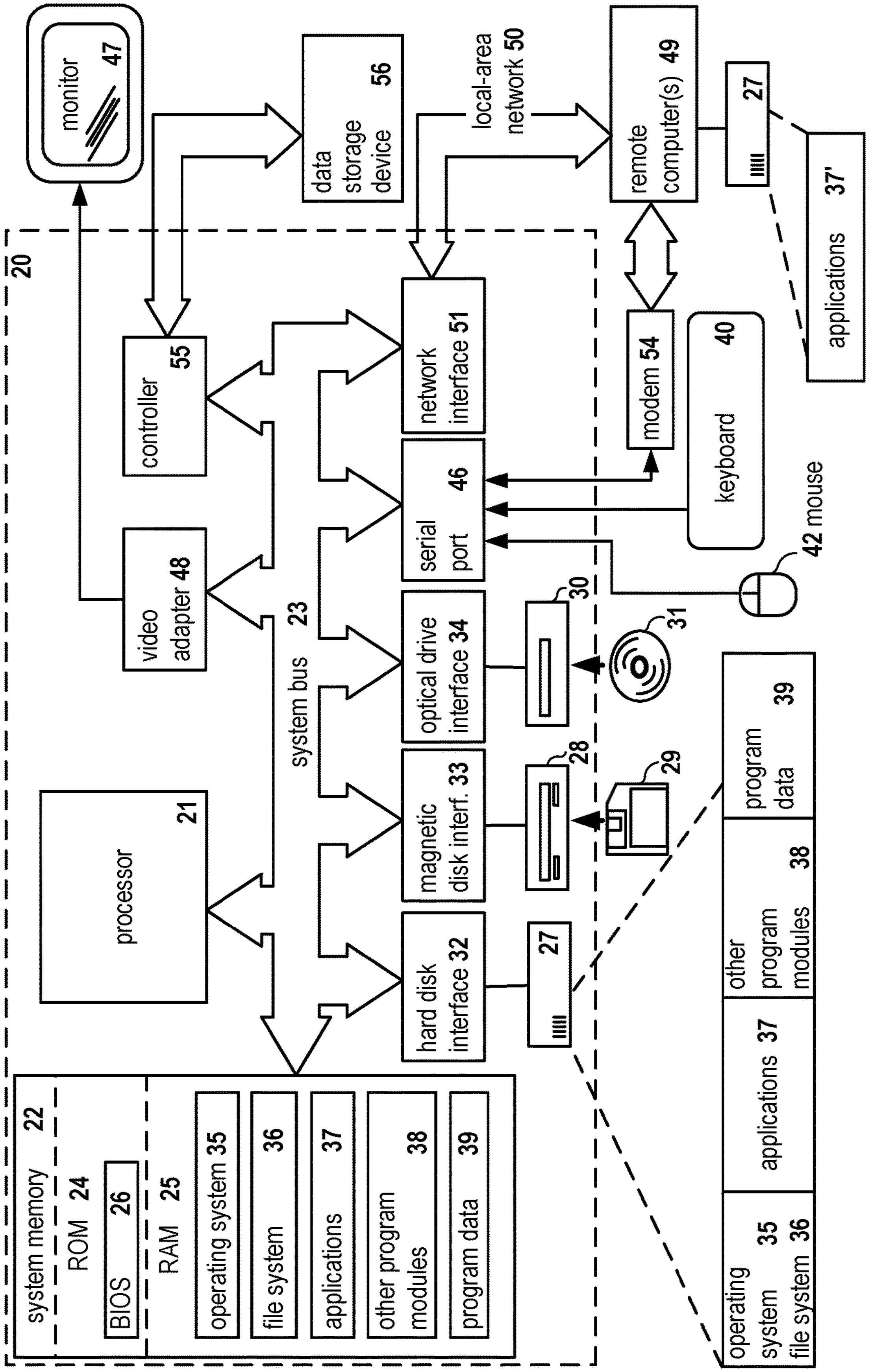
FIG. 18 is a block diagram of a computer system on which the disclosed system and method can be implemented, in accordance with various aspects of the present disclosure.

FIG. 18 is a block diagram illustrating a general-purpose computer system 20 on which aspects of systems and methods for processing files stored in object storage systems may be implemented in accordance with an example aspect. The computer system 20 can correspond to the computing device 101, the object-based storage system 103, and the physical server(s) on which the data analysis service 106, 502, 802 is executing, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An example aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with particular functions facilitated by hardware alone, and other functions facilitated by a combination of hardware and software. In particular implementations, at least a portion, and in some cases, all, of a module may be executed on the processor of a general purpose computer. Accordingly, each module may be realized in a variety of suitable configurations, and should not be limited to any particular implementation exemplified herein.

In one configuration, the data analysis service 802 and/or the computer system 20, and in particular, the file system 36 and/or the processor 21, includes means for generating an index based on a plurality of source data objects in an object storage system, the generated index comprising a manifest, at least one symbol file, and at least one locality file, the manifest comprising a tree data structure of a manifest root file with branch-leaf manifest files, the manifest root file specifying statistical values about at least a first branch-leaf manifest file based on the at least one symbol file and the at least one locality file associated with the first branch-leaf manifest file. The example data analysis service 802 and/or the computer system 20 also includes means for receiving a search query for the plurality of source data objects stored in the object storage system. The example data analysis service 802 and/or the computer system 20 also includes means for querying the generated index based on the search query and the manifest root file of the manifest. Additionally, the example data analysis service 802 and/or the computer system 20 includes means for generating a materialized view of a result set of the search query based on the querying of the generated index. The example data analysis service 802 and/or the computer system 20 also includes means for storing a cached manifest file at the generated index, the cached manifest file mapping the search query to a segment of the generated index based on the result set.

In another configuration, the example data analysis service 802 and/or the computer system 20 also includes means for selecting a subset of branch-leaf manifest files based on the statistical values of the manifest root file. The example data analysis service 802 and/or the computer system 20 also includes means for using one or more locality files and one or more symbol files associated with the selected subset of branch-leaf manifest files to return the result set based on a location of symbols in the source data objects.

In another configuration, the example data analysis service 802 and/or the computer system 20 also includes means for generating a second branch-leaf manifest file specifying statistical values associated with the selected subset of the branch-leaf manifest files. The example data analysis service 802 and/or the computer system 20 modifying the manifest root file of the generated index to include the second branch-leaf manifest file.

In another configuration, the example data analysis service 802 and/or the computer system 20 includes means linking the search query to the selected subset of the branch-leaf manifest files of the generated index based on the second branch-leaf manifest file.

In another configuration, the example data analysis service 802 and/or the computer system 20 also includes means for receiving a second search query for the plurality of source data objects stored in the object storage system. Additionally, the example data analysis service 802 and/or the computer system 20 also includes means for querying the generated index based on the second search query in a sequence order comprising the cached manifest file and the branch-leaf manifest files of the manifest root file. The example data analysis service 802 and/or the computer system 20 also includes means for generating a second materialized view of a second result set of the second search query based on the querying of the generated index in the sequence order.

In another configuration, the example data analysis service 802 and/or the computer system 20 also includes means for resolving one or more aspects of the second search query based on parsing the cached manifest file of the manifest root file. The example data analysis service 802 and/or the computer system 20 also includes means for resolving any remaining unresolved aspects of the second search query based on parsing the branch-leaf manifest files of the manifest root file.

In another configuration, the example data analysis service 802 and/or the computer system 20 also includes means for selecting a second subset of branch-leaf manifest files based on the statistical values of the manifest root file. The example data analysis service 802 and/or the computer system 20 also includes means for using one or more locality files and one or more symbol files associated with the selected second subset of branch-leaf manifest files to return the second result set based on a location of symbols in the source data objects.

In another configuration, the example data analysis service 802 and/or the computer system 20 also includes means for storing a second cached manifest file at the generated index, the second cached manifest file mapping the second search query to a second segment of the generated index based on the second result set.

In another configuration, the example data analysis service 802 and/or the computer system 20 also includes means for storing the cached manifest file in persistent storage.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents. In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for caching in object storage, comprising:

generating, by a computer system, an index based on a plurality of source data objects in an object storage system, the generated index comprising a manifest, at least one symbol file, and at least one locality file, the manifest comprising a tree data structure of a manifest root file with branch-leaf manifest files, the manifest root file specifying statistical values about at least a first branch-leaf manifest file based on the at least one symbol file and the at least one locality file associated with the first branch-leaf manifest file;

receiving, by the computer system from a computing device, a search query for the plurality of source data objects stored in the object storage system;

parsing, by the computer system, one or more cached manifest files of the manifest root file of the generated index to determine if a flagged branch corresponding to one of the one or more cached manifest files fully matches the search query or partially matches the search query, wherein the one or more cached manifest files are generated based on a previous search query;

performing, by the computer system, a full scope to select scoped segments associated with the cached manifest file when the flagged branch fully matches the search query;

querying, by the computer system, the generated index based on the manifest root file of the manifest, the full scope of the selected scoped segments, and the search query in a sequence order comprising a cached manifest file and the branch-leaf manifest files of the manifest root file, wherein the querying further comprises:

selecting a subset of branch-leaf manifest files based on the statistical values of the manifest root file; and using one or more symbol files associated with the selected subset of branch-leaf manifest files to return result set based on a location of symbols in the source data objects;

generating, by the computer system, a materialized view of the result set of the search query based on the querying of the generated index in the sequence order of the cached manifest file and the branch-leaf files; and storing, by the computer system in a persistent storage, a cached manifest file at the generated index, the cached manifest file mapping the search query to a segment of the generated index based on the result set, wherein the storing the cached manifest file further comprises:

generating a second branch-leaf manifest file specifying statistical values associated with the selected subset of the branch-leaf manifest files; and modifying the manifest root file of the generated index to include the second branch-leaf manifest file.

2. The method of claim 1, wherein querying the generated index based on the search query further comprises:

selecting a subset of branch-leaf manifest files based on the statistical values of the manifest root file; and using one or more locality files and one or more symbol files associated with the selected subset of branch-leaf manifest files to return the result set based on a location of symbols in the source data objects.

3. The method of claim 2, wherein storing the cached manifest file at the generated index further comprises:

generating a second branch-leaf manifest file specifying statistical values associated with the selected subset of the branch-leaf manifest files; and modifying the manifest root file of the generated index to include the second branch-leaf manifest file.

4. The method of claim 3, wherein the second branch-leaf manifest file links the search query to the selected subset of the branch-leaf manifest files of the generated index.

5. The method of claim 1, further comprising:

receiving a second search query for the plurality of source data objects stored in the object storage system;

querying the generated index based on the second search query in a sequence order comprising the cached manifest file and the branch-leaf manifest files of the manifest root file; and generating a second materialized view of a second result set of the second search query based on the querying of the generated index in the sequence order.

6. The method of claim 5, wherein querying the generated index based on the search query in the sequence order further comprises:

resolving one or more aspects of the second search query based on parsing the cached manifest file of the manifest root file; and resolving any remaining unresolved aspects of the second search query based on parsing the branch-leaf manifest files of the manifest root file.

7. The method of claim 6, wherein resolving an aspect of the second search query comprises:

selecting a second subset of branch-leaf manifest files based on the statistical values of the manifest root file; and using one or more locality files and one or more symbol files associated with the selected second subset of branch-leaf manifest files to return the second result set based on a location of symbols in the source data objects.

8. The method of claim 5, further comprising:

storing a second cached manifest file at the generated index, the second cached manifest file mapping the second search query to a second segment of the generated index based on the second result set.

9. The method of claim 8, further comprising:

storing the second cached manifest file in persistent storage.

10. The method of claim 1, wherein the search query comprises one of a relational query and a text search.

11. The method of claim 1, wherein the at least one symbol file includes a sorted unique set of the symbols from a source file.

12. A computer apparatus for caching in object storage, comprising:

a memory; and at least one processor coupled to the memory and configured to:

generate an index based on a plurality of source data objects in an object storage system, the generated index comprising a manifest, at least one symbol file, and at least one locality file, the manifest comprising a tree data structure of a manifest root file with branch-leaf manifest files, the manifest root file specifying statistical values about at least a first branch-leaf manifest file based on the at least one symbol file and the at least one locality file associated with the first branch-leaf manifest file;

receive a search query for the plurality of source data objects stored in the object storage system;

parse one or more cached manifest files of the manifest root file of the generated index to determine if a flagged branch corresponding to one of the one or more cached manifest files fully matches the search query or partially matches the search query, wherein the one or more cached manifest files are generated based on a previous search query;

perform a full scope to select scoped segments associated with the cached manifest file when the flagged branch fully matches the search query;

query the generated index based on the manifest root file of the manifest, the full scope of the selected scoped segments and the search query in a sequence order comprising a cached manifest file and the branch-leaf manifest files of the manifest root file, wherein to query the generated index, the at least one processor is configured to:

select a subset of branch-leaf manifest files based on the statistical values of the manifest root file; and use one or more symbol files associated with the selected subset of branch-leaf manifest files to return result set based on a location of symbols in the source data objects;

generate a materialized view of the result set of the search query based on the querying of the generated index in the sequence order of the cached manifest file and the branch-leaf manifest files; and store, in a persistent storage, a cached manifest file at the generated index, the cached manifest file mapping the search query to a segment of the generated index based on the result set, wherein to store the cached manifest file, the at least one processor is configured to:

generate a second branch-leaf manifest file specifying statistical values associated with the selected subset of the branch-leaf manifest files; and modify the manifest root file of the generated index to include the second branch-leaf manifest file.

13. The computer apparatus of claim 12, wherein to query the generated index based on the search query, the at least one processor is configured to:

select a subset of branch-leaf manifest files based on the statistical values of the manifest root file; and use one or more locality files and one or more symbol files associated with the selected subset of branch-leaf manifest files to return the result set based on a location of symbols in the source data objects.

14. The computer apparatus of claim 13, wherein to store the cached manifest file at the generated index, the at least one processor is configured to:

generate a second branch-leaf manifest file specifying statistical values associated with the selected subset of the branch-leaf manifest files; and modify the manifest root file of the generated index to include the second branch-leaf manifest file.

15. The computer apparatus of claim 12, wherein the at least one processor is further configured to:

receive a second search query for the plurality of source data objects stored in the object storage system;

query the generated index based on the second search query in a sequence order comprising the cached manifest file and the branch-leaf manifest files of the manifest root file; and generate a second materialized view of a second result set of the second search query based on the querying of the generated index in the sequence order.

16. The computer apparatus of claim 15, wherein to query the generated index based on the search query in the sequence order, the at least one processor is configured to:

resolve one or more aspects of the second search query based on parsing the cached manifest file of the manifest root file; and resolve any remaining unresolved aspects of the second search query based on parsing the branch-leaf manifest files of the manifest root file.

17. The computer apparatus of claim 16, wherein to resolve an aspect of the second search query, the at least one processor is configured to:

select a second subset of branch-leaf manifest files based on the statistical values of the manifest root file; and use one or more locality files and one or more symbol files associated with the selected second subset of branch-leaf manifest files to return the second result set based on a location of symbols in the source data objects.

18. The computer apparatus of claim 15, wherein the at least one processor is further configured to:

store a second cached manifest file at the generated index, the second cached manifest file mapping the second search query to a second segment of the generated index based on the second result set.

19. The computer apparatus of claim 18, wherein the at least one processor is further configured to:

store the second cached manifest file in persistent storage.

20. A non-transitory computer-readable medium storing computer executable code for caching in object storage, the non-transitory computer-readable medium comprising code executed by a processor to:

generate an index based on a plurality of source data objects in an object storage system, the generated index comprising a manifest, at least one symbol file, and at least one locality file, the manifest comprising a tree data structure of a manifest root file with branch-leaf manifest files, the manifest root file specifying statistical values about at least a first branch-leaf manifest file based on the at least one symbol file and the at least one locality file associated with the first branch-leaf manifest file;

receive a search query for the plurality of source data objects stored in the object storage system;

parse one or more cached manifest files of the manifest root file of the generated index to determine if a flagged branch corresponding to one of the one or more cached manifest files fully matches the search query or partially matches the search query, wherein the one or more cached manifest files are generated based on a previous search query;

perform a full scope to select scoped segments associated with the cached manifest file when the flagged branch fully matches the search query;

query the generated index based on the manifest root file of the manifest, the full scope of the selected scoped segments and the search query in a sequence order comprising a cached manifest file and the branch-leaf manifest files of the manifest root file, wherein to query the generated index further includes to:

select a subset of branch-leaf manifest files based on the statistical values of the manifest root file; and use one or more symbol files associated with the selected subset of branch-leaf manifest files to return result set based on a location of symbols in the source data objects;

generate a materialized view of the result set of the search query based on the querying of the generated index in the sequence order of the cached manifest file and the branch-leaf manifest files; and store, in a persistent storage, the cached manifest file at the generated index, the cached manifest file mapping the search query to a segment of the generated index based on the result set, wherein to store the cached manifest file further includes to:

generate a second branch-leaf manifest file specifying statistical values associated with the selected subset of the branch-leaf manifest files; and modify the manifest root file of the generated index to include the second branch-leaf manifest file.

* * * * *